United States Patent
Xu et al.

(10) Patent No.: US 11,800,155 B2
(45) Date of Patent: Oct. 24, 2023

(54) DEBLOCKING PARAMETERS FOR CHROMA COMPONENT

(71) Applicants: Beijing Bytedance Network Technology Co., Ltd., Beijing (CN); Bytedance Inc., Los Angeles, CA (US)

(72) Inventors: Jizheng Xu, San Diego, CA (US); Li Zhang, San Diego, CA (US); Ye-kui Wang, San Diego, CA (US); Kai Zhang, San Diego, CA (US); Weijia Zhu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/882,375

(22) Filed: Aug. 5, 2022

(65) Prior Publication Data
US 2022/0400293 A1    Dec. 15, 2022

Related U.S. Application Data

(63) Continuation of application No. PCT/CN2021/075443, filed on Feb. 5, 2021.

(30) Foreign Application Priority Data

Feb. 5, 2021   (WO) ............... PCT/CN2021/075443

(51) Int. Cl.
*H04N 19/86* (2014.01)
*H04N 19/117* (2014.01)
(Continued)

(52) U.S. Cl.
CPC ........... *H04N 19/86* (2014.11); *H04N 19/117* (2014.11); *H04N 19/172* (2014.11);
(Continued)

(58) Field of Classification Search
CPC .... H04N 19/86; H04N 19/117; H04N 19/186; H04N 19/196
See application file for complete search history.

(56) References Cited

U.S. PATENT DOCUMENTS

2013/0259120 A1   10/2013   Van Der Auwera et al.
2016/0234498 A1   8/2016   Misra et al.
(Continued)

FOREIGN PATENT DOCUMENTS

CN     104205836 A     12/2014
CN     106576174 A     4/2017
(Continued)

OTHER PUBLICATIONS

Document: JVET-Q2001-vB, Bross, B. et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 519 pages.
(Continued)

*Primary Examiner* — On S Mung
(74) *Attorney, Agent, or Firm* — Conley Rose, P.C.

(57) ABSTRACT

A method includes performing a conversion between a block of a video and a bitstream of the video according to a rule. The rule specifies that whether a syntax element identifying a deblocking offset for a chroma component of the video is included in a video region level is determined based on a colour format of the video.

20 Claims, 16 Drawing Sheets

(51) Int. Cl.
    *H04N 19/172*     (2014.01)
    *H04N 19/186*     (2014.01)
    *H04N 19/196*     (2014.01)
    *H04N 19/70*     (2014.01)
    *H04N 19/167*     (2014.01)

(52) U.S. Cl.
    CPC ......... *H04N 19/186* (2014.11); *H04N 19/196* (2014.11); *H04N 19/70* (2014.11); *H04N 19/167* (2014.11)

(56) References Cited

U.S. PATENT DOCUMENTS

| | | | |
|---|---|---|---|
| 2020/0077122 | A1 | 3/2020 | Makuijala et al. |
| 2020/0092546 | A1 | 3/2020 | Ye et al. |
| 2021/0218964 | A1 | 7/2021 | Park et al. |
| 2022/0368909 | A1* | 11/2022 | Park .................. H04N 19/18 |

FOREIGN PATENT DOCUMENTS

| | | |
|---|---|---|
| CN | 110662039 A | 1/2020 |
| CN | 110662054 A | 1/2020 |
| CN | 110662063 A | 1/2020 |
| CN | 110719463 A | 1/2020 |
| CN | 111919441 A | 11/2020 |
| WO | 2020169104 A1 | 8/2020 |
| WO | 2021150407 A1 | 7/2021 |

OTHER PUBLICATIONS

Bossen, F., Retrieved From the Internet: https://vcgit.hhi.fraunhofer.de/jvet/VVCSoftware_VTM/-/tags/VTM-7.3, Oct. 28, 2022, 1 page.
Document: JVET-O2011, Segall, A., et al., "JVET common test conditions and evaluation procedures for HDR/WCG video," Joint Video Exploration Team (JVET) of ITU-T SG 16 WP 3 and ISO/IEC JTC 1/SC 29/WG 11 15th Meeting: Gothenburg, SE, Jul. 3-12, 2019, 10 pages.
Document: JVET-N0258-v1, Zhu, W., et al., "CE8-related: Palette Mode Coding," Joint Video Experts Team (JVET) of ITU-T SG 16 WP 3 and ISO/IEC Jtc 1/SC 29/WG 11 14th Meeting: Geneva, CH, Mar. 19-27, 2019, pages.
Document: JVET-P0077, Chao, Y-H., et al., "CE8-1.3: Line-based CG Palette Mode," Joint Video Experts Team (JVET) of ITU-T SG 16 WP 3 and ISO/IEC JTC 1/SC 29/WG 11 16th Meeting: Geneva, CH, Oct. 1-11, 2019, 6 pages.
Document: JVET-N0309-v3, Henkel, A., et al., "Non-CE4: Switched half-pel interpolation filter, "Joint Video Experts Team (JVET) of ITU-T SG 16 WP 3 and ISO/IEC JTC 1/SC 29/WG 11 14th Meeting: Geneva, CH, Mar. 19-27, 2019, 8 pages.
Document: JVET-R2001-vA, Bross, B., et al., "Versatile Video Coding (Draft 9)," Joint Video Experts Team (JVET) of ITU-T SG 16 WP 3 and ISO/IEC JTC 1/SC 29/WG 11 18th Meeting: by teleconference, Apr. 15-24, 2020, 524 pages.
Document: JVET-Q0420-v1, Li, L., et al., "AHG12: Signaling of chroma presence in PPS and APS," Joint Video Experts Team (JVET) of ITU-T SG 16 WP 3 and ISO/IEC JTC 1/SC 29/WG 11 17th Meeting: Brussels, BE, Jan. 7-17, 2020, 3 pages.
Document: JVET-R0338-v3, Wang, Y.K. et al., "AHG9: A summary of proposals on chroma deblocking tc and β offsets signalling," Joint Video Experts Team (JVET) of ITU-T SG 16 WP 3 and ISO/IEC JTC 1/SC 29/WG 11 18th Meeting: by teleconference, Apr. 15-24, 2020, 5 pages.
Document: JVET-Q0484-v1, Wan, W., et al., "AHG9: HLS control of chroma QP offset," Joint Video Experts Team (JVET) of ITU-T SG 16 WP 3 and ISO/IEC JTC 1/SC 29/WG 11 17th Meeting: Brussels, BE, Jan. 7-17, 2020, 2 pages.
Document: JVET-P0539-v2, Xu, J., et al., "Non-CE5: A chroma deblocking clean-up," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Document: JVET-O2001-vE, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 455 pages.
Foreign Communication From A Related Counterpart Application, International Application No. PCT/CN2021/075408, English Translation of International Search Report dated Apr. 25, 2021, 12 pages.
Foreign Communication From A Related Counterpart Application, International Application No. PCT/CN2021/075443, English Translation of International Search Report dated Apr. 30, 2021, 14 pages.
Document: JVET-L0336-v3, Chao, Y., et al., "CE15-2: Palette mode of HEVC SCC," Joint Video Experts Team (JVET) of ITU-T SG 16 WP 3 and ISO/IEC JTC 1/SC 29/WG 11 12th Meeting: Macao, CN, Oct. 3-12, 2018, 8 pages.
Non-Final Office Action dated Jan. 19, 2023,22 pages, U.S. Appl. No. 17/882,359, filed Aug. 5, 2022.
Document: JVET-R0077-v1, Xu, J., et al., "Chroma deblocking parameters based on chroma coding tools," Joint Video Experts Team (JVET) of ITU-T SG 16 WP 3 and ISO/IEC JTC 1/SC 29/WG 11 18th Meeting: by teleconference, Apr. 15-24, 2020, 3 pages.
Document: JVET-O0616, Zhang, N., et al., "Non-CE: Various chroma format support in VVC," Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.
Document: JVET-Q0593-v1, Wang, Y., et al., "AHG9: A summary of proposals on parameter sets cleanups," Joint Video Experts Team (JVET) of ITU-T SG 16 WP 3 and ISO/IEC JTC 1/SC 29/WG 11 17th Meeting: Brussels, BE, Jan. 7-17, 2020, 8 pages.
Document: JVET-Q0291-v2, Sarwer, M., et al., "CE2-related: On maximum palette size of VVC," Joint Video Experts Team (JVET) of ITU-T SG 16 WP 3 and ISO/IEC JTC 1/SC 29/WG 11 17th Meeting: Brussels, BE, Jan. 7-17, 2020, 4 pages.
Document: JVET-R0412-v1, Chao, Y., et al., "AHG11: On maximum palette size and palette predictor size under local dual tree," Joint Video Experts Team (JVET) of ITU-T SG 16 WP 3 and ISO/IEC JTC 1/SC 29/WG 11 18th Meeting: by teleconference, Apr. 15-24, 2020, 2 pages.
Foreign Communication From A Related Counterpart Application, European Application No. 21750205.3, Extended European Search Report dated May 24, 2023, 13 pages.
Foreign Communication From A Related Counterpart Application, European Application No. 21750399.4, Extended European Search Report dated May 8, 2023, 13 pages.

* cited by examiner

US 11,800,155 B2

DEBLOCKING PARAMETERS FOR CHROMA COMPONENT

CROSS REFERENCE TO RELATED APPLICATIONS

This application is a continuation of International Patent Application No. PCT/CN2021/075443, filed on Feb. 5, 2021, which claims the priority to and benefits of International Patent Application No. PCT/CN2020/074316, filed on Feb. 5, 2020, both of which are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for video processing using a palette mode in which a palette of representative sample values is used for representation of video.

In one example aspect, a video processing method is disclosed. The method includes performing a conversion between a block of a video and a bitstream of the video according to a rule specifying that whether a syntax element identifying a deblocking offset for a chroma component of the video is included in a video region level is determined based on a colour format of the video.

In another example aspect, a video processing method is disclosed. The method includes performing a conversion between a block of a video and a bitstream of the video according to a rule specifying that whether a syntax element identifying a deblocking offset for a chroma component of the video is included in a video region level is determined based on a syntax flag indicating whether a coding tool that processes different colour components separately is enabled.

In another example aspect, a video processing method is disclosed. The method includes performing a conversion between a block of a video and a bitstream of the video according to a rule specifying that whether a syntax element identifying a deblocking offset for a chroma component of the video is included in a video region level is determined based on a syntax flag specifying whether parameters of a coding tool for the chroma component are present in the bitstream.

In another example aspect, a video processing method is disclosed. The method includes performing a conversion between a block of a video and a bitstream of the video according to a rule specifying that a syntax flag indicating whether a chroma quantization parameter offset is processed for the conversion also indicates whether a deblocking offset for a chroma component of the video is present or processed for the conversion.

In another example aspect, a video processing method is disclosed. The method includes performing a conversion between a video block of a video and a coded representation of the video, wherein a palette mode is used for the coded representation of the video block in which samples of the video block are represented using a palette of a representative colour values; and wherein samples outside of the palette are coded using an escape symbol and a value that is quantized using a quantization parameter that is in a range between a minimum allowed value and a maximum allowed value that are determined by a rule.

In another example aspect, a video processing method is disclosed. The method includes performing a conversion between a video block of a video and a coded representation of the video, wherein a palette mode is used for the coded representation of the video block in which samples of the video block are represented using a palette of a representative colour values; and wherein a size of the palette is depended on a rule about whether local dual tree is used for the conversion between the video block and the coded representation.

In another example aspect, a video processing method is disclosed. The method includes performing a conversion between a video block of a video and a coded representation of the video, wherein a palette mode is used for the coded representation of the video block in which samples of the video block are represented using a palette of a representative colour values; and wherein a size of the palette predictor is depended on a rule about whether local dual tree is used for the conversion between the video block and the coded representation.

In another example aspect, a video processing method is disclosed. The method includes determining, for a conversion between a video block of a video region of a video and a coded representation of the video, based on a coding condition, whether a syntax element identifying a deblocking offset for a chroma component of the video is included in the coded representation at the video region level; and performing the conversion based on the determining; wherein the deblocking offset is used to selectively enable a deblocking operation on the video block.

In another example aspect, a video processing method is disclosed. The method includes determining, for a conversion between a video block of a video region of a video and a coded representation of the video, based on a coding condition, whether a syntax element identifying use of a chroma coding tool is included in the coded representation at the video region level; and performing the conversion based on the determining; wherein the deblocking offset is used to selectively enable a deblocking operation on the video block.

In another example aspect, a video processing method is disclosed. The method includes performing a conversion between a video block of a video region of a video and a coded representation of the video, wherein the coded representation conforms to a format; wherein the format specifies that whether a first flag indicating a deblocking offset for a chroma component of the video is included in the coded representation is based on whether a second flag indicating a quantization parameter offset of the chroma component is included in the coded representation.

In another example aspect, a video processing method is disclosed. The method includes performing a conversion between a video block of a video region of a video and a coded representation of the video, wherein the coded representation conforms to a format rule; wherein the format rule specifies that a syntax element in the coded representation controls whether one or more parameters indicating applicability of one or more chroma coding tools are included in the coded representation at the video region or the video block level.

In yet another example aspect, a video encoder apparatus is disclosed. The video encoder comprises a processor configured to implement the above-described methods.

In yet another example aspect, a video decoder apparatus is disclosed. The video decoder comprises a processor configured to implement the above-described methods.

In yet another example aspect, a computer readable medium having code stored thereon is disclosed. The code embodies one of the methods described herein in the form of processor-executable code.

These, and other, features are described throughout the present document.

DETAILED DESCRIPTION

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Overview

This document is related to video coding technologies. Specifically, it is related to index and escape symbols coding in palette coding and chroma format signalling. It may be applied to the existing video coding standard like High Efficiency Video Coding (HEVC), or the standard (Versatile Video Coding (VVC)) to be finalized. It may be also applicable to future video coding standards or video codec.

2. Video Coding Standards

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced MPEG-1 and MPEG-4 Visual, and the two organizations jointly produced the H.262/MPEG-2 Video and H.264/moving pictures experts group (MPEG)-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by video coding experts group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Palette Mode in HEVC Screen Content Coding Extensions (HEVC-SCC)

2.1.1 Concept of Palette Mode

Figure 1:
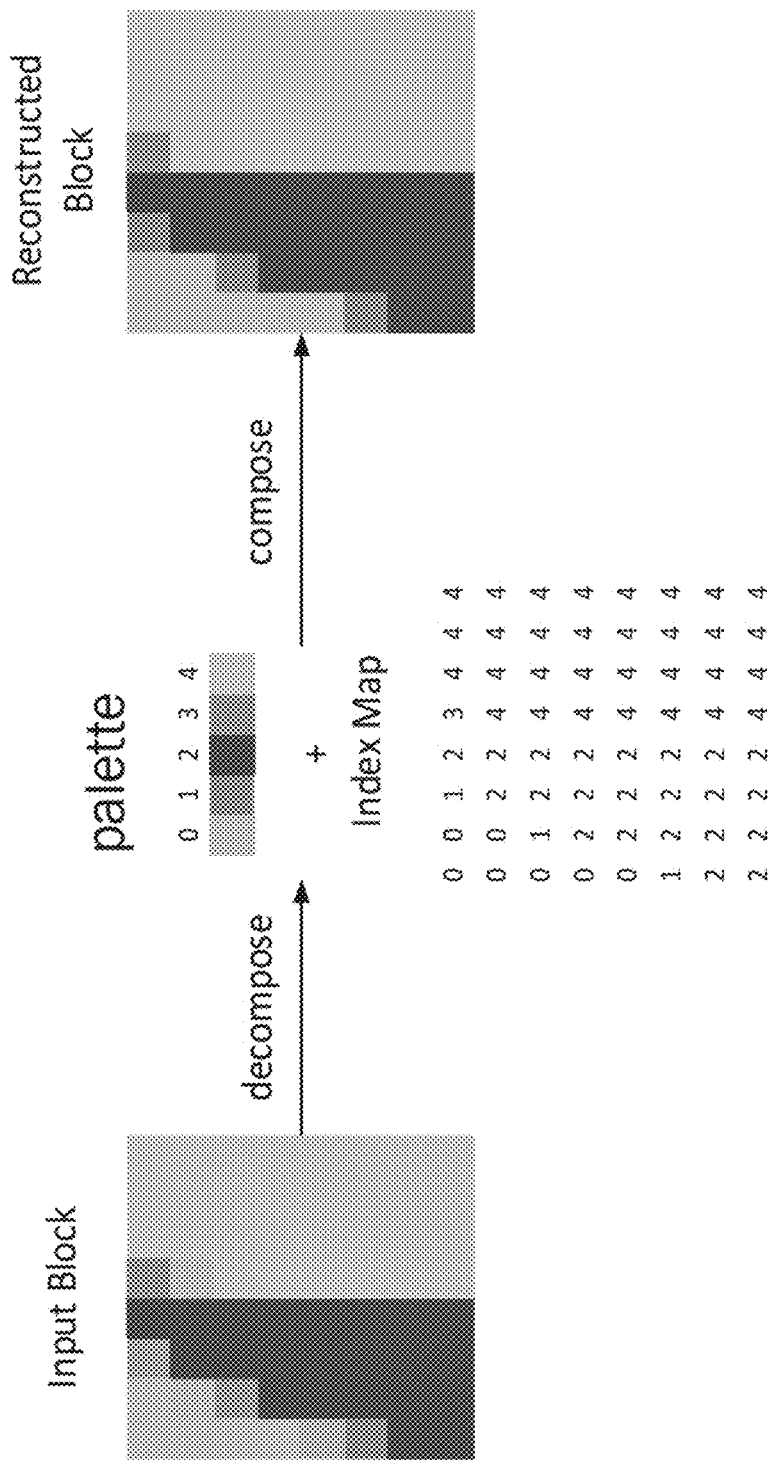
FIG. 1 shows an example of a block coded in palette mode.

The basic idea behind a palette mode is that the pixels in the coding unit (CU) are represented by a small set of representative colour values. This set is referred to as the palette. And it is also possible to indicate a sample that is outside the palette by signalling an escape symbol followed by (possibly quantized) component values. This kind of pixel is called escape pixel. The palette mode is illustrated in FIG. 1. As depicted in FIG. 1, for each pixel with three colour components (luma, and two chroma components), an index to the palette is founded, and the block could be reconstructed based on the founded values in the palette.

2.1.2 Coding of the Palette Entries

For coding of the palette entries, a palette predictor is maintained. The maximum size of the palette as well as the palette predictor is signalled in the SPS. In HEVC-Screen Content Coding Extension (SCC), a palette_predictor_initializer_present flag is introduced in the picture parameter set (PPS). When this flag is 1, entries for initializing the palette predictor are signalled in the bitstream. The palette predictor is initialized at the beginning of each coding tree unit (CTU) row, each slice and each tile. Depending on the value of the palette_predictor_initializer_present flag, the palette predictor is reset to 0 or initialized using the palette predictor intializer entries signalled in the PPS. In HEVC-SCC, a palette predictor initializer of size 0 was enabled to allow explicit disabling of the palette predictor initialization at the PPS level.

Figure 2:
FIG. 2 illustrates use of a palette predictor to signal palette entries.

For each entry in the palette predictor, a reuse flag is signalled to indicate whether it is part of the current palette. This is illustrated in FIG. 2. The reuse flags are sent using run-length coding of zeros. After this, the number of new palette entries are signalled using Exponential Golomb (EG)

code of order 0, i.e., EG-0. Finally, the component values for the new palette entries are signalled.

2.1.3 Coding of Palette Indices

Figure 3:
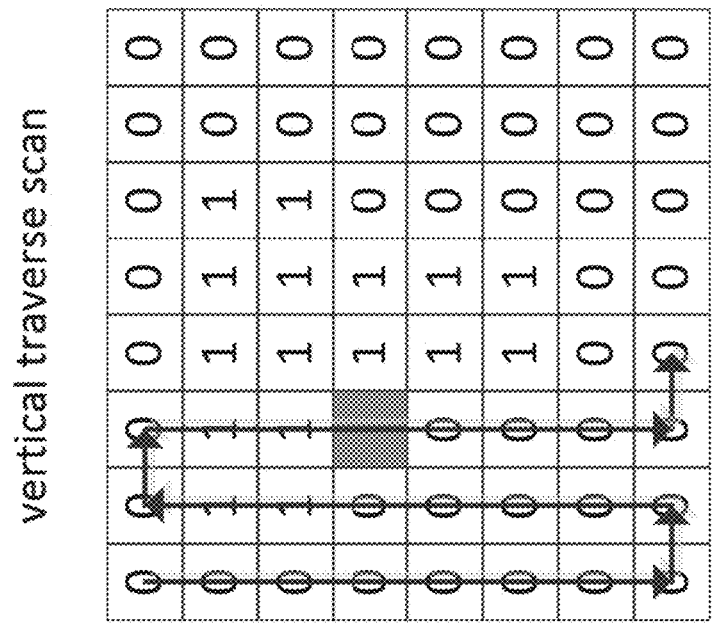
FIG. 3 shows examples of horizontal and vertical traverse scans.
Figure 3:
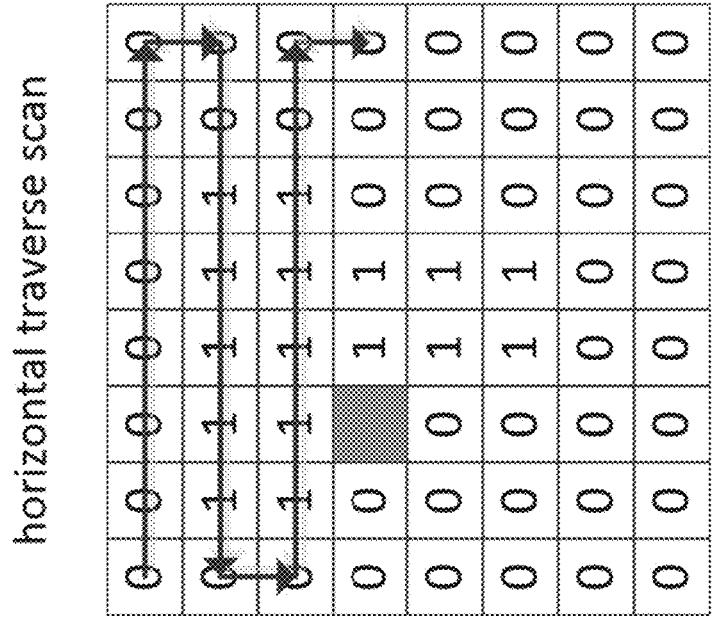

The palette indices are coded using horizontal and vertical traverse scans as shown in FIG. 3. The scan order is explicitly signalled in the bitstream using the palette_transpose_flag. For the rest of the subsection it is assumed that the scan is horizontal.

The palette indices are coded using two palette sample modes: 'COPY_LEFT' and 'COPY_ABOVE'. In the 'COPY_LEFT' mode, the palette index is assigned to a decoded index. In the 'COPY_ABOVE' mode, the palette index of the sample in the row above is copied. For both "COPY_LEFT" and 'COPY_ABOVE' modes, a run value is signalled which specifies the number of subsequent samples that are also coded using the same mode.

Figure 4:
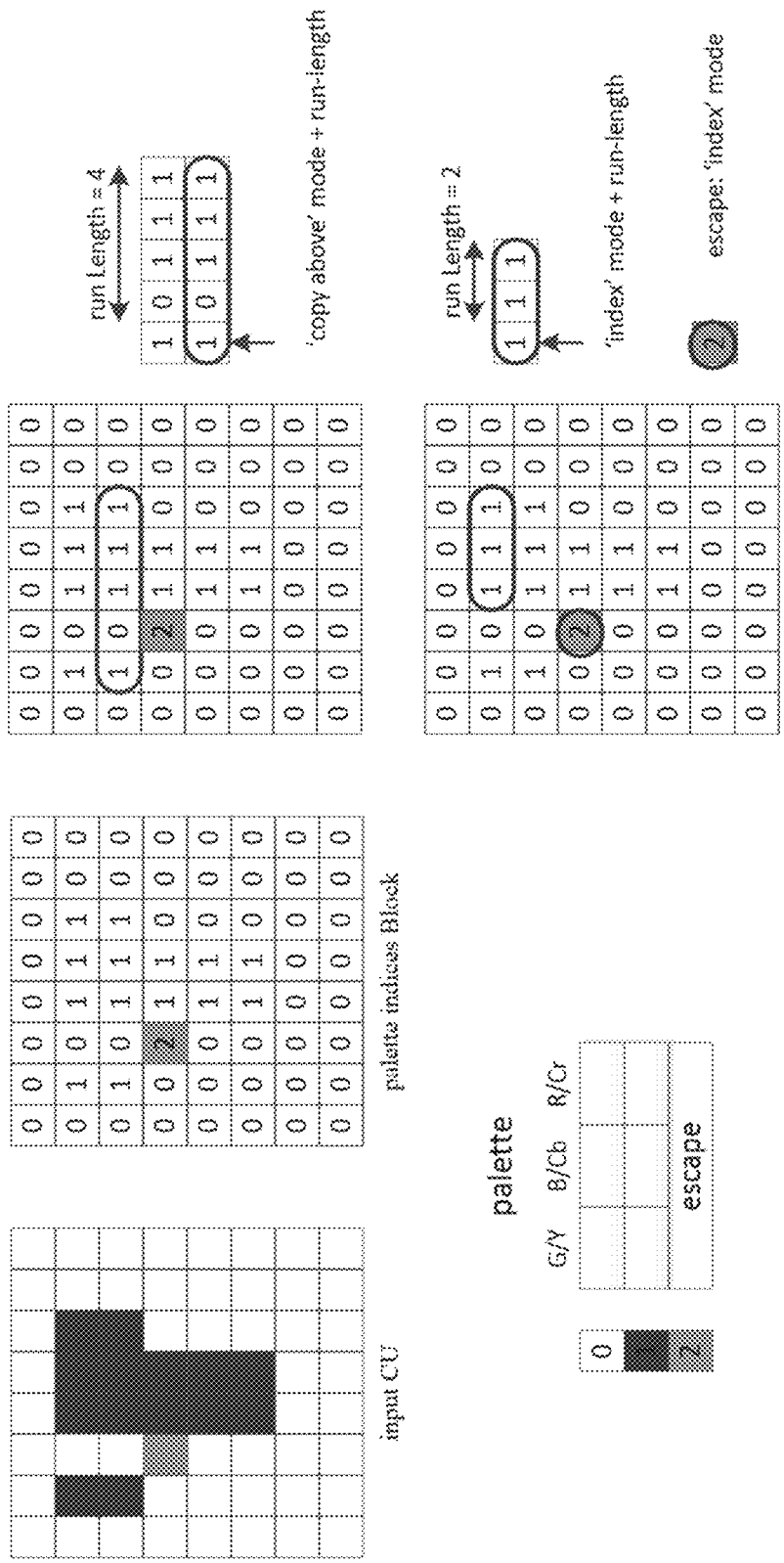
FIG. 4 illustrates an example coding of palette indices.

In the palette mode, the value of an index for the escape symbol is the number of palette entries. And, when escape symbol is part of the run in 'COPY_LEFT' or 'COPY_ABOVE' mode, the escape component values are signalled for each escape symbol. The coding of palette indices is illustrated in FIG. 4.

This syntax order is accomplished as follows. First the number of index values for the CU is signalled. This is followed by signalling of the actual index values for the entire CU using truncated binary coding. Both the number of indices as well as the index values are coded in bypass mode. This groups the index-related bypass bins together. Then the palette sample mode (if necessary) and run are signalled in an interleaved manner. Finally, the component escape values corresponding to the escape symbols for the entire CU are grouped together and coded in bypass mode. The binarization of escape symbols is EG coding with 3rd order, i.e., EG-3.

An additional syntax element, last_run_type_flag, is signalled after signalling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signalling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signalling is for the escape component values. For each escape symbol, the number of escape component values signalled may be different depending on the number of components associated with that symbol.

FIG. 4 illustrates an example coding of palette indices.

In addition, there is an index adjustment process in the palette index coding. When signalling a palette index, the left neighboring index or the above neighboring index should be different from the current index. Therefore, the range of the current palette index could be reduced by 1 by removing one possibility. After that, the index is signalled with truncated binary (TB) binarization.

The texts related to this part is shown as follows, where the CurrPaletteIndex is the current palette index and the adjustedRefPaletteIndex is the prediction index.

The variable PaletteIndexMap[xC][yC] specifies a palette index, which is an index to the array represented by CurrentPaletteEntries. The array indices xC, yC specify the location (xC, yC) of the sample relative to the top-left luma sample of the picture. The value of PaletteIndexMap[xC][yC] may be in the range of 0 to MaxPaletteIndex, inclusive.

The variable adjustedRefPaletteIndex is derived as follows:

```
adjustedRefPaletteIndex = MaxPaletteIndex + 1
if( PaletteScanPos > 0 ) {
  xcPrev =
x0 + TraverseScanOrder[ log2CbWidth ][ log2bHeight ][ PaletteScanPos − 1 ][ 0 ]
  ycPrev =
y0 + TraverseScanOrder[ log2CbWidth ][ log2bHeight ][ PaletteScanPos − 1 ][ 1 ]
  if( CopyAboveIndicesFlag[ xcPrev ][ ycPrev ] = = 0 ) {
    adjustedRefPaletteIndex = PaletteIndexMap[ xcPrev ][ ycPrev ] {
    (7-157)
  }
  else {
    if( !palette_transpose_flag )
      adjustedRefPaletteIndex = PaletteIndexMap[ xC ][ yC − 1 ]
    else
      adjustedRefPaletteIndex = PaletteIndexMap[ xC − 1 ][ yC ]
  }
}
```

When CopyAboveIndicesFlag[xC][yC] is equal to 0, the variable CurrPaletteIndex is derived as follows:

```
if( CurrPaletteIndex >= adjustedRefPaletteIndex )
  CurrePaletteIndex++
```

In addition, the run length elements in the palette mode are context coded. The related context derivation process described in JVET-O2011-vE is shown as follows.

Derivation process of ctxInc for the syntax element palette_run_prefix

Inputs to this process are the bin index binIdx and the syntax elements copy_above_palette_indices_flag and palette_idx_idc.

Output of this process is the variable ctxInc.

The variable ctxInc is derived as follows:

If copy_above_palette_indices_flag is equal to 0 and binIdx is equal to 0, ctxInc is derived as follows:

$$ctxInc = (palette\_idx\_idc<1)?0: ((palette\_idx\_idc<3)?1:2) \quad (9\text{-}69)$$

Otherwise, ctxInc is provided by Table 1:

TABLE 1

| Specification of ctxIdxMap[ copy_above_palette_indices_flag ][ binIdx ] | | | | | |
|---|---|---|---|---|---|
| binIdx | 0 | 1 | 2 | 3 | 4 | >4 |
| copy_above_palette_indices_flag = = 1 | 5 | 6 | 6 | 7 | 7 | bypass |
| copy_above_palette_indices_flag = = 0 | 0, 1, 2 | 3 | 3 | 4 | 4 | bypass |

2.2 Palette Mode in VVC

2.2.1 Palette in Dual Tree

In VVC, the dual tree coding structure is used on coding the intra slices, so the luma component and two chroma components may have different palette and palette indices. In addition, the two chroma component shares same palette and palette indices.

2.2.2 Palette as a Separate Mode

In some embodiments, the prediction modes for a coding unit can be MODE_INTRA, MODE_INTER, MODE_IBC and MODE_PLT. The binarization of prediction modes is changed accordingly.

When intra block copy (IBC) is turned off, on I tiles, the first one bin is employed to indicate whether the current prediction mode is MODE_PLT or not. While on PB tiles, the first bin is employed to indicate whether the current prediction mode is MODE_INTRA or not. If not, one additional bin is employed to indicate the current prediction mode is MODE_PLT or MODE_INTER.

When IBC is turned on, on I tiles, the first bin is employed to indicate whether the current prediction mode is MODE_IBC or not. If not, the second bin is employed to indicate whether the current prediction mode is MODE_PLT or MODE_INTRA. While on PB tiles, the first bin is employed to indicate whether the current prediction mode is MODE_INTRA or not. If it's an intra mode, the second bin is employed to indicate the current prediction mode is MODE_PLT or MODE_INTRA. If not, the second bin is employed to indicate the current prediction mode is MODE_IBC or MODE_INTER.

Example texts are shown as follows.

| coding_unit( x0, y0, cbWidth, cbHeight, cqtDepth, treeType, modeType ) { | Descriptor |
|---|---|
|   chType = treeType = = DUAL_TREE_CHROMA? 1 : 0 | |
|   if( slice_type != I \| \| sps_ibc_enabled_flag \| \| sps_palette_enabled_flag) { | |
|     if( treeType != DUAL_TREE_CHROMA && | |
|     !( ( ( cbWidth = = 4 && cbHeight = = 4 ) \| \| modeType = = MODE_TYPE_INTRA ) | |
|     && !sps_ibc_enabled_flag ) ) | |
|     cu_skip_flag[ x0 ][ y0 ] | ae(v) |
|     if( cu_skip_flag[ x0 ][ y0 ] = = 0 && slice_type != I | |
|     && !( cbWidth = = 4 && cbHeight = = 4 ) && modeType = = MODE_TYPE_ALL ) | |
|     pred_mode_flag | ae(v) |
|     if( ( ( slice_type = = I && cu_skip_flag[ x0 ][ y0 ] = =0 ) \| \| | |
|       ( slice_type != I && ( CuPredMode[ chType ][ x0 ][ y0 ] != MODE_INTRA \| \| | |
|       ( cbWidth = = 4 && cbHeight = = 4 && cu_skip_flag[ x0 ][ y0 ] = = 0 ) ) ) ) && | |
|     cbWidth <= 64 && cbHeight <= 64 && modeType != MODE_TYPE_INTER && | |
|     sps_ibc_enabled_flag && treeType != DUAL_TREE_CHROMA ) | |
|     pred_mode_ibc_flag | ae(v) |
|     if( ( ( ( slice_type = = I \| \| ( cbWidth = = 4 && cbHeight = = 4 ) \| \| sps_ibc_enabled_flag ) && | |
|       CuPredMode[ x0 ][ y0 ] = = MODE_INTRA ) \| \| | |
|       ( slice_type != I && !(cbWidth = = 4 && cbHeight = = 4 ) && !sps_ibc_enabled_flag | |
|       && CuPredMode[ x0 ][ y0 ] != MODE_INTRA ) ) && | |
|     sps_palette_enabled_flag && | |
|     cbWidth <= 64 && cbHeight <= 64 && cu_skip_flag[ x0 ][ y0 ] = = 0 && | |
|     modeType != MODE_TYPE_INTER ) | |
|     pred_mode_plt_flag | ae(v) |
|   } | |
|   ... | |
| } | |

2.2.3 Palette Mode Syntax

| palette_coding( x0, y0, cbWidth, cbHeight, startComp, numComps ) { | Descriptor |
|---|---|
|   palettePredictionFinished = 0 | |
|   NumPredictedPaletteEntries = 0 | |
|   for( predictorEntryIdx = 0; predictorEntryIdx < PredictorPaletteSize[ startComp ] && | |
|   !palettePredictionFinished && | |
|   NumPredictedPaletteEntries[ startComp ] < palette_max_size; predictorEntryIdx++ ) { | |
|     palette_predictor_run | ae(v) |
|     if( palette_predictor_run != 1 ) { | |
|     if( palette_predictor_run > 1 ) | |
|       predictorEntryIdx += palette_predictor_run − 1 | |
|     PalettePredictorEntryReuseFlags[ predictorEntryIdx ] = 1 | |
|     NumPredictedPaletteEntries++ | |
|     } else | |
|     palettePredictionFinished = 1 | |
|   } | |
|   if( NumPredictedPaletteEntries < palette_max_size ) | |

-continued

| palette_coding( x0, y0, cbWidth, cbHeight, startComp, numComps ) { | Descriptor |
|---|---|
|     num_signalled_palette_entries | ae(v) |
|     for( cIdx = startComp; cIdx < ( startComp + numComps); cIdx++ ) | |
|         for( i = 0; i < num_signalled_palette_entries; i++ ) | |
|             new_palette_entries[ cIdx ][ i ] | ae(v) |
|     if( CurrentPaletteSize[ startComp ] > 0 ) | |
|         palette_escape_val_present_flag | ae(v) |
|     if( MaxPaletteIndex > 0 ) { | |
|         num_palette_indices_minus1 | ae(v) |
|         adjust = 0 | |
|         for( i = 0; i <= num_palette_indices_minus1; i++ ) { | |
|             if( MaxPaletteIndex − adjust > 0 ) { | |
|                 palette_idx_idc | ae(v) |
|                 PaletteIndexIdc[ i ] = palette_idx_idc | |
|             } | |
|             adjust = 1 | |
|         } | |
|         copy_above_indices_for_final_run_flag | ae(v) |
|         palette_transpose_flag | ae(v) |
|     } | |
|     if( treeType != DUAL_TREE_CHROMA && palette_escape_val_present_flag ) { | |
|         if( cu_qp_delta_enabled_flag && !IsCuQpDeltaCoded ) { | |
|             cu_qp_delta_abs | ae(v) |
|             if( cu_qp_delta_abs ) | |
|                 cu_qp_delta_sign_flag | ae(v) |
|         } | |
|     } | |
|     if( treeType != DUAL_TREE_LUMA && palette_escape_val_present_flag ) { | |
|         if( cu_chroma_qp_offset_enabled_flag && !IsCuChromaQpOffsetCoded ) { | |
|             cu_chroma_qp_offset_flag | ae(v) |
|             if( cu_chroma_qp_offset_flag ) | |
|                 cu_chroma_qp_offset_idx | ae(v) |
|         } | |
|     } | |
|     remainingNumIndices = num_palette_indices_minus1 + 1 | |
|     PaletteScanPos = 0 | |
|     log2CbWidth = Log2( cbWidth ) | |
|     log2CbHeight = Log2( cbHeight ) | |
|     while( PaletteScanPos < cbWidth*cbHeightt ) { | |
|         xC = x0 + TraverseScanOrder[ log2CbWidth ][ log2CbHeight ][ PaletteScanPos ][ 0 ] | |
|         yC = y0 + TraverseScanOrder[ log2CbWidth ][ log2CbHeight ][ PaletteScanPos ][ 1 ] | |
|         if( PaletteScanPos > 0 ) { | |
|             xcPrev = x0 + TraverseScanOrder[ log2CbWidth ][ log2CbHeight ][ PaletteScanPos − 1 ][ 0 ] | |
|             ycPrev = y0 + TraverseScanOrder[ log2CbWidth ][ log2CbHeight ][ PaletteScanPos − 1 ][ 1 ] | |
|         } | |
|         PaletteRunMinus1 = cbWidth * cbHeight − PaletteScanPos − 1 | |
|         RunToEnd = 1 | |
|         CopyAboveIndicesFlag[ xC ][ yC ] = 0 | |
|         if( MaxPaletteIndex > 0 ) | |
|         if( ( ( !palette_transpose_flag && yC > 0 ) | | ( palette_transpose_flag && xC > 0 ) ) | |
|             && CopyAboveIndicesFlag[ xcPrev ][ ycPrev ] = = 0 ) | |
|         if( remainingNumIndices > 0 && PaletteScanPos < cbWidth* cbHeight − 1 ) { | |
|             copy_above_palette_indices_flag | ae(v) |
|             CopyAboveIndicesFlag[ xC ][ yC ] = copy_above_palette_indices_flag | |
|         } else { | |
|             if( PaletteScanPos = = cbWidth * cbHeight − 1 && remainingNumIndices > 0 ) | |
|                 CopyAboveIndicesFlag[ xC ][ yC ] = 0 | |
|             else | |
|                 CopyAboveIndicesFlag[ xC ][ yC ] = 1 | |
|         } | |
|         if ( CopyAboveIndicesFlag[ xC ][ yC ] = = 0 ) { | |
|         currNumIndices = num_palette_indices_minus1 + 1 − remainingNumIndices | |
|         PaletteIndexMap[ xC ][ yC ] = PaletteIndexIdc[ currNumIndices ] | |
|         } | |
|         if( MaxPaletteIndex > 0 ) { | |
|             if( CopyAboveIndicesFlag[ xC ][ yC ] = = 0 ) | |
|                 remainingNumIndices − = 1 | |
|             if( remainingNumIndices > 0 | | CopyAboveIndicesFlag[ xC ][ yC ] != | |
|             copy_above_indices_for_final_run_flag ) { | |
|                 PaletteMaxRunMinus1 = cbWidth * cbHeight − PaletteScanPos − 1 − | |

-continued

| palette_coding( x0, y0, cbWidth, cbHeight, startComp, numComps ) { | Descriptor |
|---|---|
|       remainingNumIndices – copy_above_indices_for_final_run_flag | |
|       RunToEnd = 0 | |
|       if( PaletteMaxRunMinus1 > 0 ) { | |
|       palette_run_prefix | ae(v) |
|       if( ( palette_run_prefix > 1 ) && ( PaletteMaxRunMinus1 != | |
|       ( 1 << ( palette_run_prefix – 1 ) ) ) ) | |
|       palette_run_suffix | ae(v) |
|       } | |
|   } | |
|  } | |
|  } | |
|  runPos = 0 | |
|  while ( runPos <= PaletteRunMinus1 ) { | |
|   xR = x0 + | |
|   TraverseScanOrder[ log2CbWidth ][ log2CbHeight ][ PaletteScanPos ][ 0 ] | |
|   yR = | |
| y0 + TraverseScanOrder[ log2CbWidth ][ log2CbHeight ][ PaletteScanPos ][ 1 ] | |
|   if( CopyAboveIndicesFlag[ xC ][ yC ] = = 0 ) { | |
|     CopyAboveIndicesFlag[ xR ][ yR ] = 0 | |
|     PaletteIndexMap[ xR ][ yR ] = PaletteIndexMap[ xC ][ yC ] | |
|   } else { | |
|     CopyAboveIndicesFlag[ xR ][ yR ] = 1 | |
|     if ( !palette_transpose_flag ) | |
|     PaletteIndexMap[ xR ][ yR ] = PaletteIndexMap[ xR ][ yR – 1 ] | |
|     else | |
|     PaletteIndexMap[ xR ][ yR ] = PaletteIndexMap[ xR – 1 ][ yR ] | |
|   } | |
|   runPos++ | |
|   PaletteScanPos ++ | |
|  } | |
| } | |
| if( palette_escape_val_present_flag ) { | |
|  for( cIdx = startComp; cIdx < ( startComp + numComps ); cIdx++ ) | |
|   for( sPos = 0; sPos < cbWidth* cbHeight; sPos++ ) { | |
|     xC = x0 + TraverseScanOrder[ log2CbWidth ][ log2CbHeight ][ sPos ][ 0 ] | |
|     yC = y0 + TraverseScanOrder[ log2CbWidth ][ log2CbHeight ][ sPos ][ 1 ] | |
|     if( PaletteIndexMap[ cIdx ][ xC ][ yC ] = = MaxPaletteIndex ) { | |
|     palette_escape_val | ae(v) |
|     PaletteEscapeVal[ cIdx ][ xC ][ yC ] = palette_escape_val | |
|     } | |
|   } | |
|  } | |
| } | |

2.2.4 Palette Mode Semantics

In the following semantics, the array indices x0, y0 specify the location (x0, y0) of the top-left luma sample of the considered coding block relative to the top-left luma sample of the picture. The array indices xC, yC specify the location (xC, yC) of the sample relative to the top-left luma sample of the picture. The array index startComp specifies the first colour component of the current palette table. startComp equal to 0 indicates the Y component; startComp equal to 1 indicates the Cb component; startComp equal to 2 indicates the Cr component. numComps specifies the number of colour components in the current palette table.

The predictor palette consists of palette entries from previous coding units that are used to predict the entries in the current palette.

The variable PredictorPaletteSize[startComp] specifies the size of the predictor palette for the first colour component of the current palette table startComp. PredictorPaletteSize is derived as specified in clause 8.4.5.3.

The variable PalettePredictorEntryReuseFlags[i] equal to 1 specifies that the i-th entry in the predictor palette is reused in the current palette. PalettePredictorEntryReuseFlags[i] equal to 0 specifies that the i-th entry in the predictor palette is not an entry in the current palette. All elements of the array PalettePredictorEntryReuseFlags[i] are initialized to 0.

palette_predictor run is used to determine the number of zeros that precede a non-zero entry in the array PalettePredictorEntryReuseFlags.

For bitstream conformance, the value of palette_predictor run may be in the range of 0 to (PredictorPaletteSize—predictorEntryIdx), inclusive, where predictorEntryIdx corresponds to the current position in the array PalettePredictorEntryReuseFlags. The variable NumPredictedPaletteEntries specifies the number of entries in the current palette that are reused from the predictor palette. The value of NumPredictedPaletteEntries may be in the range of 0 to palette_max_size, inclusive.

num_signalled_palette entries specifies the number of entries in the current palette that are explicitly signalled for the first colour component of the current palette table startComp.

When num_signalled_palette entries is not present, it is inferred to be equal to 0.

The variable CurrentPaletteSize[startComp] specifies the size of the current palette for the first colour component of the current palette table startComp and is derived as follows:

CurrentPaletteSize[startComp]=NumPredictedPaletteEntries+num_signalled_palette_entries    (7-155)

The value of CurrentPaletteSize[startComp] may be in the range of 0 to palette_max_size, inclusive.

new_palette_entries[cIdx][i] specifies the value for the i-th signalled palette entry for the colour component cIdx.

The variable PredictorPaletteEntries[cIdx][i] specifies the i-th element in the predictor palette for the colour component cIdx.

The variable CurrentPaletteEntries[cIdx][i] specifies the i-th element in the current palette for the colour component cIdx and is derived as follows:

```
numPredictedPaletteEntries = 0
for( i = 0; i < PredictorPaletteSize[ startComp ]; i++ )
  if( PalettePredictorEntryReuseFlags[ i ] ) {
    for( cIdx =startComp; cIdx < ( startComp + numComps ); cIdx++ )
      CurrentPaletteEntries[ cIdx ][ numPredictedPaletteEntries ] =
PredictorPaletteEntries[ cIdx ][ i ]
    numPredictedPaletteEntries++
  }
for( cIdx = startComp; cIdx < (startComp + numComps); cIdx++)    (7-156)
  for( i = 0; i < num_signalled_palette_entries[startComp]; i++ )
    CurrentPaletteEntries[ cIdx ][ numPredictedPaletteEntries + i ] =
      new_palette_entries[ cIdx ][ i ]
``` palette_escape_val_present_flag equal to 1 specifies that the current coding unit contains at least one escape coded sample. escape_val_present_flag equal to 0 specifies that there are no escape coded samples in the current coding unit. When not present, the value of palette_escape_val_present_flag is inferred to be equal to 1.

The variable MaxPaletteIndex specifies the maximum possible value for a palette index for the current coding unit. The value of MaxPaletteIndex is set equal to CurrentPaletteSize[startComp]−1+palette_escape_val_present_flag. num_palette_indices_minus1 plus 1 is the number of palette indices explicitly signalled or inferred for the current block. When num_palette_indices_minus1 is not present, it is inferred to be equal to 0.

palette_idx_idc is an indication of an index to the palette table, CurrentPaletteEntries. The value of palette_idx_idc may be in the range of 0 to MaxPaletteIndex, inclusive, for the first index in the block and in the range of 0 to (MaxPaletteIndex−1), inclusive, for the remaining indices in the block.

When palette_idx_idc is not present, it is inferred to be equal to 0.

The variable PaletteIndexIdc[i] stores the i-th palette_idx_idc explicitly signalled or inferred. All elements of the array PaletteIndexIdc[i] are initialized to 0.

copy_above_indices_for_final_run_flag equal to 1 specifies that the palette indices of the last positions in the coding unit are copied from the palette indices in the row above if horizontal traverse scan is used or the palette indices in the left column if vertical traverse scan is used. copy_above_indices_for_final_run_flag equal to 0 specifies that the palette indices of the last positions in the coding unit are copied from PaletteIndexIdc[num_palette_indices_minus1].

When copy_above_indices_for_final_run_flag is not present, it is inferred to be equal to 0. palette_transpose_flag equal to 1 specifies that vertical traverse scan is applied for scanning the indices for samples in the current coding unit. palette_transpose_flag equal to 0 specifies that horizontal traverse scan is applied for scanning the indices for samples in the current coding unit. When not present, the value of palette transpose_flag is inferred to be equal to 0.

The array TraverseScanOrder specifies the scan order array for palette coding. TraverseScanOrder is assigned the horizontal scan order HorTravScanOrder if palette_transpose_flag is equal to 0 and TraverseScanOrder is assigned the vertical scan order VerTravScanOrder if palette_transpose_flag is equal to 1.

copy_above_palette_indices_flag equal to 1 specifies that the palette index is equal to the palette index at the same location in the row above if horizontal traverse scan is used or the same location in the left column if vertical traverse scan is used. copy above_palette indices flag equal to 0 specifies that an indication of the palette index of the sample is coded in the bitstream or inferred. The variable CopyAboveIndicesFlag[xC][yC] equal to 1 specifies that the palette index is copied from the palette index in the row above (horizontal scan) or left column (vertical scan). CopyAboveIndicesFlag[xC][yC] equal to 0 specifies that the palette index is explicitly coded in the bitstream or inferred. The array indices xC, yC specify the location (xC, yC) of the sample relative to the top-left luma sample of the picture. The value of PaletteIndexMap[xC][yC] may be in the range of 0 to (MaxPaletteIndex−1), inclusive.

The variable PaletteIndexMap[xC][yC] specifies a palette index, which is an index to the array represented by CurrentPaletteEntries. The array indices xC, yC specify the location (xC, yC) of the sample relative to the top-left luma sample of the picture. The value of PaletteIndexMap[xC] [yC] may be in the range of 0 to MaxPaletteIndex, inclusive. The variable adjustedRefPaletteIndex is derived as follows:

```
adjustedRefPaletteIndex = MaxPaletteIndex + 1
if( PaletteScanPos > 0 ) {
  xcPrev =
x0 + TraverseScanOrder[ log2CbWidth ][ log2bHeight ][
PaletteScanPos − 1 ][ 0 ]
  ycPrev =
y0 + TraverseScanOrder[ log2CbWidth ][ log2bHeight ][
PaletteScanPos − 1 ][ 1 ]
  if( CopyAboveIndicesFlag[ xcPrev ][ ycPrev ] = = 0 ) {
    adjustedRefPaletteIndex = PaletteIndexMap[ xcPrev ][ ycPrev ] {
    (7-157)
  }
  else {
    if( !palette_transpose_flag )
      adjustedRefPaletteIndex = PaletteIndexMap[ xC ][ yC − 1 ]
    else
      adjustedRefPaletteIndex = PaletteIndexMap[ xC − 1 ][ yC ]
  }
}
```

When CopyAboveIndicesFlag[xC][yC] is equal to 0, the variable CurrPaletteIndex is derived as follows:

```
          if( CurrPaletteIndex >= adjustedRefPaletteIndex )
            CurrePaletteIndex++  (7-158)
``` palette_run_prefix, when present, specifies the prefix part in the binarization of PaletteRunMinus1.

palette_run_suffix is used in the derivation of the variable PaletteRunMinus1. When not present, the value of palette run suffix is inferred to be equal to 0.

When RunToEnd is equal to 0, the variable PaletteRunMinus1 is derived as follows:

If PaletteMaxRunMinus1 is equal to 0, PaletteRunMinus1 is set equal to 0.

Otherwise (PaletteMaxRunMinus1 is greater than 0) the following applies:

If palette_run_prefix is less than 2, the following applies:

PaletteRunMinus1=palette_run_prefix                (7-159)

Otherwise (palette_run_prefix is greater than or equal to 2), the following applies:

PrefixOffset=1<<(palette_run_prefix−1)
  PaletteRunMinus1=PrefixOffset+palette_run_suffix                (7-160)

The variable PaletteRunMinus1 is used as follows:

If CopyAboveIndicesFlag[xC][yC] is equal to 0, PaletteRunMinus1 specifies the number of consecutive locations minus 1 with the same palette index.

Otherwise if palette_transpose_flag is equal to 0, PaletteRunMinus1 specifies the number of consecutive locations minus 1 with the same palette index as used in the corresponding position in the row above.

Otherwise, PaletteRunMinus1 specifies the number of consecutive locations minus 1 with the same palette index as used in the corresponding position in the left column.

When RunToEnd is equal to 0, the variable PaletteMaxRunMinus1 represents the maximum possible value for PaletteRunMinus1, and for bitstream conformance, the value of PaletteMaxRunMinus1 may be greater than or equal to 0.

palette_escape_val specifies the quantized escape coded sample value for a component.

The variable PaletteEscapeVal[cIdx][xC][yC] specifies the escape value of a sample for which PaletteIndexMap [xC][yC] is equal to MaxPaletteIndex and palette_escape_val_present_flag is equal to 1. The array index cIdx specifies the colour component. The array indices xC, yC specify the location (xC, yC) of the sample relative to the top-left luma sample of the picture.

For bitstream conformance, the PaletteEscapeVal[cIdx] [xC][yC] may be in the range of 0 to (1<<(BitDepthy+1))−1, inclusive, for cIdx equal to 0, and in the range of 0 to (1<<(BitDepthc+1))−1, inclusive, for cIdx not equal to 0.

2.2.5 Line Based CG Palette Mode

Line based coefficient group (CG) palette mode was adopted to VVC. In this method, each CU of palette mode is divided into multiple segments of m samples (m=16 in this test) based on the traverse scan mode. The encoding order for palette run coding in each segment is as follows: for each pixel, 1 context coded bin *run_copy_flag = 0* is signalled indicating if the pixel is of the same mode as the previous pixel, i.e., if the previous scanned pixel and the current pixel are both of run type COPY_ABOVE or if the previous scanned pixel and the current pixel are both of run type INDEX and the same index value. Otherwise, *run_copy_flag = 1* is signalled. If the pixel and the previous pixel are of different mode, one context coded bin *copy_above_ palette_indices_flag* is signalled indicating the run type, i.e., INDEX or COPY ABOVE, of the pixel. Same as the palette mode in VTM6.0, decoder doesn't have to parse run type if the sample is in the first row (horizontal traverse scan) or in the first column (vertical traverse scan) since the INDEX mode is used by default. Also, decoder doesn't have to parse run type if the previously parsed run type is COPY_ABOVE. After palette run coding of pixels in one segment, the index values (for INDEX mode) and quantized escape colours are bypass coded and grouped apart from encoding/parsing of context coded bins to improve throughput within each line CG. Since the index value is now coded/parsed after run coding, instead of processed before palette run coding as in VTM, encoder doesn't have to signal the number of index values *num_palette_ indices_minus1* and the last run type *copy_above_ indices_for_final _run_flag*

The texts of line based CG palette mode in some embodiments is shown as follows.

Palette Coding Syntax

| palette_coding( x0, y0, cbWidth, cbHeight, startComp, numComps ) { | Descriptor |
|---|---|
|   palettePredictionFinished = 0 | |
|   NumPredictedPaletteEntries = 0 | |
|   for( predictorEntryIdx = 0; predictorEntryIdx < PredictorPaletteSize[ startComp ] && | |
|     !palettePredictionFinished && | |
|     NumPredictedPaletteEntries[ startComp ] < palette_max_size; predictorEntryIdx++ ) { | |
|     palette_predictor_run | ae(v) |
|     if( palette_predictor_run != 1 ) { | |
|       if( palette_predictor_run > 1 ) | |
|         predictorEntryIdx += palette_predictor_run − 1 | |
|       PalettePredictorEntryReuseFlags[ predictorEntryIdx ] = 1 | |
|       NumPredictedPaletteEntries++ | |
|     } else | |
|       palettePredictionFinished = 1 | |
|   } | |
|   if( NumPredictedPaletteEntries < palette_max_size ) | |
|     num_signalled_palette_entries | ae(v) |
|   for( cIdx = startComp; cIdx < ( startComp + numComps); cIdx++ ) | |
|     for( i = 0; i < num_signalled_palette_entries; i++ ) | |
|       new_palette_entries[ cIdx ][ i ] | ae(v) |
|   if( CurrentPaletteSize[ startComp ] > 0 ) | |
|     palette_escape_val_present_flag | ae(v) |
|   if( MaxPaletteIndex > 0 ) { | |
|     adjust = 0 | |
|     palette_transpose_flag | ae(v) |
|   } | |
|   if( treeType != DUAL_TREE_CHROMA && palette_escape_val_present_flag ) { | |
|     if( cu_qp_delta_enabled_flag && !IsCuQpDeltaCoded ) { | |
|       cu_qp_delta_abs | ae(v) |
|       if( cu_qp_delta_abs ) | |
|         cu_qp_delta_sign_flag | ae(v) |
|     } | |
|   } | |

| palette_coding( x0, y0, cbWidth, cbHeight, startComp, numComps ) { | Descriptor |
|---|---|
|     if( treeType != DUAL_TREE_LUMA && palette_escape_val_present_flag ) { | |
|       if( cu_chroma_qp_offset_enabled_flag && !IsCuChromaQpOffsetCoded ) { | |
|         cu_chroma_qp_offset_flag | ae(v) |
|         if( cu_chroma_qp_offset_flag ) | |
|           cu_chroma_qp_offset_idx | ae(v) |
|       } | |
|     } | |
|     PreviousRunTypePosition = 0 | |
|     PreviousRunType = 0 | |
|     for (subSetId = 0; subSetId <= (cbWidth* cbHeight − 1) >> 4; subSetId++) { | |
|       minSubPos = subSetId << 4 | |
|     if( minSubPos + 16 > cbWidth * cbHeight) | |
|       maxSubPos = cbWidth * cbHeight | |
|     else | |
|       maxSubPos = minSubPos + 16 | |
|     RunCopyMap[ 0 ][ 0 ] = 0 | |
|     log2CbWidth = Log2( cbWidth ) | |
|     log2CbHeight = Log2( cbHeight ) | |
|     PaletteScanPos = minSubPos | |
|     while( PaletteScanPos < maxSubPos ) { | |
|       xC = | |
| x0 + TraverseScanOrder[ log2CbWidth ][ log2CbHeight ][ PaletteScanPos ][ 0 ] | |
|       yC = | |
| y0 + TraverseScanOrder[ log2CbWidth ][ log2CbHeight ][ PaletteScanPos ][ 1 ] | |
|       if( PaletteScanPos > 0 ) { | |
|         xcPrev = | |
| x0 + TraverseScanOrder[ log2CbWidth ][ log2CbHeight ][ PaletteScanPos − 1 ][ 0 ] | |
|         ycPrev = | |
| y0 + TraverseScanOrder[ log2CbWidth ][ log2CbHeight ][ PaletteScanPos − 1 ][ 1 ] | |
|       } | |
|       if ( MaxPaletteIndex > 0 && PaletteScanPos > 0) { | |
|         run_copy_flag | ae(v) |
|         RunCopyMap[ xC ][ yC ] = run_copy_flag | |
|       } | |
|       CopyAboveIndicesFlag[ xC ][ yC ] = 0 | |
|       if( MaxPaletteIndex > 0 && ! RunCopyMap[startComp][xC][yC] ) { | |
|         if( ( ( !palette_transpose_flag && yC > 0 ) \|\| ( palette_transpose_flag && xC > 0 ) ) | |
|         && CopyAboveIndicesFlag[ xcPrev ][ ycPrev ] == 0 ) { | |
|           copy_above_palette_indices_flag | ae(v) |
|           CopyAboveIndicesFlag[ xC ][ yC ] = copy_above_palette_indices_flag | |
|         } | |
|         PreviousRunType = CopyAboveIndicesFlag[ xC ][ yC ] | |
|         PreviousRunTypePosition = curPos | |
|       } else { | |
|         CopyAboveIndicesFlag[ xC ][ yC ] = CopyAboveIndicesFlag[xcPrev][ycPrev] | |
|       } | |
|     } | |
|     PaletteScanPos ++ | |
|     } | |
|     PaletteScanPos = minSubPos | |
|     while( PaletteScanPos < maxSubPos ) { | |
|       xC = | |
| x0 + TraverseScanOrder[ log2CbWidth ][ log2CbHeight ][ PaletteScanPos ][ 0 ] | |
|       yC = | |
| y0 + TraverseScanOrder[ log2CbWidth ][ log2CbHeight ][ PaletteScanPos ][ 1 ] | |
|       if( PaletteScanPos > 0 ) { | |
|         xcPrev = | |
| x0 + TraverseScanOrder[ log2CbWidth ][ log2CbHeight ][ PaletteScanPos − 1 ][ 0 ] | |
|         ycPrev = | |
| y0 + TraverseScanOrder[ log2CbWidth ][ log2CbHeight ][ PaletteScanPos − 1 ][ 1 ] | |
|       } | |
|     if ( MaxPaletteIndex > 0 ) { | |
|       if ( ! RunCopyMap [ x C][ yC ] && CopyAboveIndicesFlag[ xC ][ yC ] == 0 ) { | |
|         if( MaxPaletteIndex − adjust > 0 ) { | |
|           palette_idx_idc | ae(v) |
|         } | |
|         adjust = 1 | |
|       } | |
|     } | |
|     if ( ! RunCopyMap [ xC][ yC ] && CopyAboveIndicesFlag[ xC ][ yC ] == 0 ) { | |
|       CurrPaletteIndex = palette_idx_idc | |
|       if( CopyAboveIndicesFlag[ xC ][ yC ] == 0 ) { | |
|         PaletteIndexMap[ xC ][ yC ] = CurrPaletteIndex | |

| palette_coding( x0, y0, cbWidth, cbHeight, startComp, numComps ) { | Descriptor |
|---|---|
|     } else {<br>      if ( !palette_transpose_flag )<br>        PaletteIndexMap[ xC ][ yC ] = PaletteIndexMap[ xC ][ yC − 1 ]<br>      else<br>        PaletteIndexMap[ xC ][ yC ] = PaletteIndexMap[ xC − 1 ][ yC ]<br>    }<br>  }<br>  if( palette_escape_val_present_flag ) {<br>    for( cIdx = startComp; cIdx < ( startComp + numComps ); cIdx++ )<br>      for( sPos = minSubPos ; sPos < maxSubPos; sPos++ ) {<br>        xC =<br>x0 + TraverseScanOrder[ log2CbWidth][ log2CbHeight ][ sPos ][ 0 ]<br>        yC =<br>y0 + TraverseScanOrder[ log2CbWidth][ log2CbHeight ][ sPos ][ 1 ]<br>        if( PaletteIndexMap[ cIdx ][ xC ][ yC ] = = MaxPaletteIndex ) {<br>          palette_escape_val<br>          PaletteEscapeVal[ cIdx ][ xC ][ yC ] = palette_escape_val<br>        }<br>      }<br>    }<br>  }<br>} | <br><br><br><br><br><br><br><br><br><br><br><br><br><br><br><br><br>ae(v) |

7.4.9.6 Palette Coding Semantics

In the following semantics, the array indices x0, y0 specify the location (x0, y0) of the top-left luma sample of the considered coding block relative to the top-left luma sample of the picture. The array indices xC, yC specify the location (xC, yC) of the sample relative to the top-left luma sample of the picture. The array index startComp specifies the first colour component of the current palette table. startComp equal to 0 indicates the Y component; startComp equal to 1 indicates the Cb component; startComp equal to 2 indicates the Cr component. numComps specifies the number of colour components in the current palette table.

The predictor palette consists of palette entries from previous coding units that are used to predict the entries in the current palette.

The variable PredictorPaletteSize[startComp] specifies the size of the predictor palette for the first colour component of the current palette table startComp. PredictorPaletteSize is derived as specified in clause 8.4.5.3.

The variable PalettePredictorEntryReuseFlags[i] equal to 1 specifies that the i-th entry in the predictor palette is reused in the current palette. PalettePredictorEntryReuseFlags[i] equal to 0 specifies that the i-th entry in the predictor palette is not an entry in the current palette. All elements of the array PalettePredictorEntryReuseFlags[i] are initialized to 0.

palette_predictor_run is used to determine the number of zeros that precede a non-zero entry in the array PalettePredictorEntryReuseFlags.

For bitstream conformance, the value of palette predictor run may be in the range of 0 to (PredictorPaletteSize−predictorEntryIdx), inclusive, where predictorEntryIdx corresponds to the current position in the array PalettePredictorEntryReuseFlags. The variable NumPredictedPaletteEntries specifies the number of entries in the current palette that are reused from the predictor palette. The value of NumPredictedPaletteEntries may be in the range of 0 to palette_max_size, inclusive.

num_signalled_palette_entries specifies the number of entries in the current palette that are explicitly signalled for the first colour component of the current palette table startComp.

When num_signalled_palette_entries is not present, it is inferred to be equal to 0.

The variable CurrentPaletteSize[startComp] specifies the size of the current palette for the first colour component of the current palette table startComp and is derived as follows:

$$CurrentPaletteSize[startComp]=NumPredictedPaletteEntries+num\_signalled\_palette\_entries \quad (7\text{-}155)$$

The value of CurrentPaletteSize[startComp] may be in the range of 0 to palette_max_size, inclusive.

new_palette_entries[cIdx][i] specifies the value for the i-th signalled palette entry for the colour component cIdx.

The variable PredictorPaletteEntries[cIdx][i] specifies the i-th element in the predictor palette for the colour component cIdx.

The variable CurrentPaletteEntries[cIdx][i] specifies the i-th element in the current palette for the colour component cIdx and is derived as follows:

```
numPredictedPaletteEntries = 0
for( i = 0; i < PredictorPaletteSize[ startComp ]; i++ )
   if( PalettePredictorEntryReuseFlags[ i ] ) {
      for( cIdx =startComp; cIdx < ( startComp + numComps ); cIdx++ )
         CurrentPaletteEntries[ cIdx ][ numPredictedPaletteEntries ] =
PredictorPaletteEntries[ cIdx ][ i ]
         numPredictedPaletteEntries++
      }
for( cIdx = startComp; cIdx < (startComp + numComps); cIdx++)   (7-156)
   for( i = 0; i < num_signalled_palette_entries[startComp]; i++ )
      CurrentPaletteEntries[ cIdx ][ numPredictedPaletteEntries + i ] =
         new_palette_entries[ cIdx ][ i ]
``` palette_escape_val_present_flag equal to 1 specifies that the current coding unit contains at least one escape coded sample. escape_val_present_flag equal to 0 specifies that there are no escape coded samples in the current coding unit. When not present, the value of palette_escape_val_present_flag is inferred to be equal to 1.

The variable MaxPaletteIndex specifies the maximum possible value for a palette index for the current coding unit. The value of MaxPaletteIndex is set equal to CurrentPaletteSize[startComp]−1+palette_escape_val_present_flag.

palette_idx_idc is an indication of an index to the palette table, CurrentPaletteEntries. The value of palette_idx_idc may be in the range of 0 to MaxPaletteIndex, inclusive, for the first index in the block and in the range of 0 to (MaxPaletteIndex−1), inclusive, for the remaining indices in the block.

When palette_idx_idc is not present, it is inferred to be equal to 0.

palette_transpose_flag equal to 1 specifies that vertical traverse scan is applied for scanning the indices for samples in the current coding unit. palette_transpose_flag equal to 0 specifies that horizontal traverse scan is applied for scanning the indices for samples in the current coding unit. When not present, the value of palette_transpose_flag is inferred to be equal to 0.

The array TraverseScanOrder specifies the scan order array for palette coding. TraverseScanOrder is assigned the horizontal scan order HorTravScanOrder if palette_transpose_flag is equal to 0 and TraverseScanOrder is assigned the vertical scan order VerTravScanOrder if palette_transpose_flag is equal to 1.

run_copy_flag equal to 1 specifies that the palette run type is the same run type at the previously scanned position and palette run index is the same as the index at the previous position if copy above_palette indices flag is equal to 0. Otherwise, run_copy_flag is equal to 0 copy_above_palette_indices_flag equal to 1 specifies that the palette index is equal to the palette index at the same location in the row above if horizontal traverse scan is used or the same location in the left column if vertical traverse scan is used, copy above_palette indices flag equal to 0 specifies that an indication of the palette index of the sample is coded in the bitstream or inferred. The variable CopyAboveIndicesFlag[xC][yC] equal to 1 specifies that the palette index is copied from the palette index in the row above (horizontal scan) or left column (vertical scan). CopyAboveIndicesFlag[xC][yC] equal to 0 specifies that the palette index is explicitly coded in the bitstream or inferred. The array indices xC, yC specify the location (xC, yC) of the sample relative to the top-left luma sample of the picture.

The variable PaletteIndexMap[xC][yC] specifies a palette index, which is an index to the array represented by CurrentPaletteEntries. The array indices xC, yC specify the location (xC, yC) of the sample relative to the top-left luma sample of the picture. The value of PaletteIndexMap[xC][yC] may be in the range of 0 to MaxPaletteIndex, inclusive.

The variable adjustedRefPaletteIndex is derived as follows:

```
adjustedRefPaletteIndex = MaxPaletteIndex + 1
if( PaletteScanPos > 0 ) {
  xcPrev =
  x0 + TraverseScanOrder[ log2CbWidth ][ log2bHeight ][
  PaletteScanPos − 1 ][ 0 ]
  ycPrev =
  y0 + TraverseScanOrder[ log2CbWidth ][ log2bHeight ][
  PaletteScanPos − 1 ][ 1 ]
    if( CopyAboveIndicesFlag[ xcPrev ][ ycPrev ] = = 0 ) {
      adjustedRefPaletteIndex = PaletteIndexMap[ xcPrev ][ ycPrev ] {
      (7-157)
    }
    else {
      if( !palette_transpose_flag )
        adjustedRefPaletteIndex = PaletteIndexMap[ xC ][ yC − 1 ]
      else
        adjustedRefPaletteIndex = PaletteIndexMap[ xC − 1 ][ yC ]
    }
}
```

When CopyAboveIndicesFlag[xC][yC] is equal to 0, the variable CurrPaletteIndex is derived as follows:

```
if( CurrPaletteIndex >= adjustedRefPaletteIndex )
    CurrePaletteIndex++ (7-158)
``` palette_escape_val specifies the quantized escape coded sample value for a component.

The variable PaletteEscapeVal[cIdx][xC][yC] specifies the escape value of a sample for which PaletteIndexMap[xC][yC] is equal to MaxPaletteIndex and palette_escape_val_present_flag is equal to 1. The array index cIdx specifies the colour component. The array indices xC, yC specify the location (xC, yC) of the sample relative to the top-left luma sample of the picture.

For bitstream conformance, the PaletteEscapeVal[cIdx][xC][yC] may be in the range of 0 to (1<<(BitDepthy+1))−1, inclusive, for cIdx equal to 0, and in the range of 0 to (1<<(BitDepthc+1))−1, inclusive, for cIdx not equal to 0.

2.3 Local Dual Tree in VVC

In typical hardware video encoders and decoders, processing throughput drops when a picture has more small intra blocks because of sample processing data dependency between neighbouring intra blocks. The predictor generation of an intra block may include top and left boundary reconstructed samples from neighbouring blocks. Therefore, intra prediction has to be sequentially processed block by block.

In HEVC, the smallest intra CU is 8×8 luma samples. The luma component of the smallest intra CU can be further split into four 4×4 luma intra prediction units (PUs), but the chroma components of the smallest intra CU cannot be further split. Therefore, the worst case hardware processing throughput occurs when 4×4 chroma intra blocks or 4×4 luma intra blocks are processed.

In VTM5.0, in single coding tree, since chroma partitions always follows luma and the smallest intra CU is 4×4 luma samples, the smallest chroma intra CB is 2×2. Therefore, in VTM5.0, the smallest chroma intra CBs in single coding tree is 2×2. The worst case hardware processing throughput for VVC decoding is only ¼ of that for HEVC decoding. Moreover, the reconstruction process of a chroma intra CB becomes much more complex than that in HEVC after adopting tools including cross-component linear model (CCLM), 4-tap interpolation filters, position-dependent intra prediction combination (PDPC), and combined inter intra prediction (CIIP). It is challenging to achieve high processing throughput in hardware decoders. In this section, a method that improves the worst case hardware processing throughput is proposed.

The goal of this method is to disallow chroma intra CBs smaller than 16 chroma samples by constraining the partitioning of chroma intra CBs.

In single coding tree, a SCIPU is defined as a coding tree node whose chroma block size is larger than or equal to TH chroma samples and has at least one child luma block smaller than 4TH luma samples, where TH is set to 16 in this contribution. In each SCIPU, all CBs may be inter, or all CBs may be non-inter, i.e., either intra or IBC. In case of a non-inter SCIPU, the chroma of the non-inter SCIPU may not be further split and luma of the SCIPU is allowed to be further split. In this way, the smallest chroma intra CB size is 16 chroma samples, and 2×2, 2×4, and 4×2 chroma CBs are removed. In addition, chroma scaling is not applied in case of a non-inter SCIPU. In addition, when luma blocks are further split and chroma blocks are not split, a local dual tree coding structure is constructed.

Figures 5A, 5B:
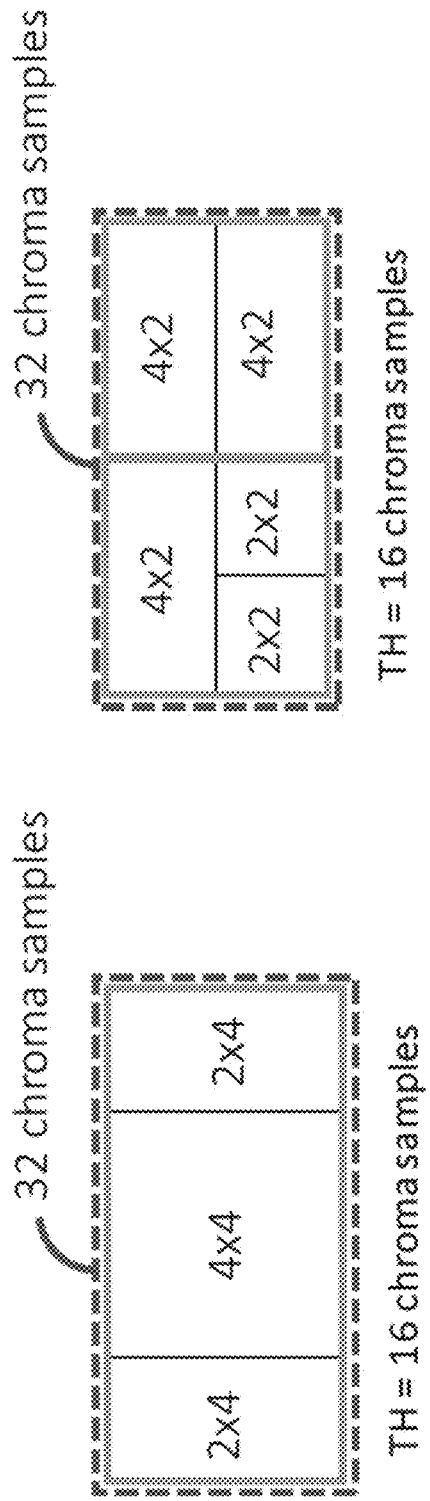
FIG. 5A shows an example of smallest chroma inter prediction units (SCIPU).
FIG. 5B shows another example of smallest chroma inter prediction units (SCIPU).

Two SCIPU examples are shown in FIGS. 5A-5B. In FIG. 5A, one chroma CB of 8×4 chroma samples and three luma CBs (4×8, 8×8, 4×8 luma CBs) form one SCIPU because the ternary tree (TT) split from the 8×4 chroma samples would result in chroma CBs smaller than 16 chroma samples. In FIG. 5B, one chroma CB of 4×4 chroma samples (the left side of the 8×4 chroma samples) and three luma CBs (8×4, 4×4, 4×4 luma CBs) form one SCIPU, and the other one chroma CB of 4×4 samples (the right side of the 8×4 chroma samples) and two luma CBs (8×4, 8×4 luma CBs) form one SCIPU because the binary tree (BT) split from the 4×4 chroma samples would result in chroma CBs smaller than 16 chroma samples.

In the proposed method, the type of a SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one signalled flag before parsing the CUs in the SCIPU.

By applying the above method, the worst case hardware processing throughput occurs when 4×4, 2×8, or 8×2 chroma blocks, instead of a 2×2 chroma blocks, are processed. The worst case hardware processing throughput is the same as that in HEVC and is 4× of that in VTM5.0.

2.4 Transform Skip (TS)

As in HEVC, the residual of a block can be coded with transform skip mode. To avoid the redundancy of syntax coding, the transform skip flag is not signalled when the CU level MTS_CU_flag is not equal to zero. The block size limitation for transform skip is the same as that for multiple transform selection(MTS) in JEM4, which indicate that transform skip is applicable for a CU when both block width and height are equal to or less than 32. Note that implicit MTS transform is set to discrete cosine transform (DCT)2 when low-frequency non-separable transform (LFNST) or matrix-based intra predictionMIP is activated for the current CU. Also the implicit MTS can be still enabled when MTS is enabled for inter coded blocks.

In addition, for transform skip block, minimum allowed Quantization Parameter (QP) is defined as 6*(internalBit-Depth−inputBitDepth)+4.

2.5 Alternative Luma Half-Pel Interpolation Filters

In some embodiments, alternative half-pel interpolation filters are proposed.

The switching of the half-pel luma interpolation filter is done depending on the motion vector accuracy. In addition to the existing quarter-pel, full-pel, and 4-pel adaptive motion vector resolution (AMVR) modes, a new half-pel accuracy AMVR mode is introduced. Only in case of half-pel motion vector accuracy, an alternative half-pel luma interpolation filter can be selected.

For a non-affine non-merge inter-coded CU which uses half-pel motion vector accuracy (i.e., the half-pel AMVR mode), a switching between the HEVC/VVC half-pel luma interpolation filter and one or more alternative half-pel interpolation is made based on the value of a new syntax element hpelIfIdx. The syntax element hpelIfIdx is only signalled in case of half-pel AMVR mode. In case of skip/merge mode using a spatial merging candidate, the value of the syntax element hpelIfIdx is inherited from the neighbouring block.

2.6 Adaptive Colour Transform (ACT)

Figure 6:
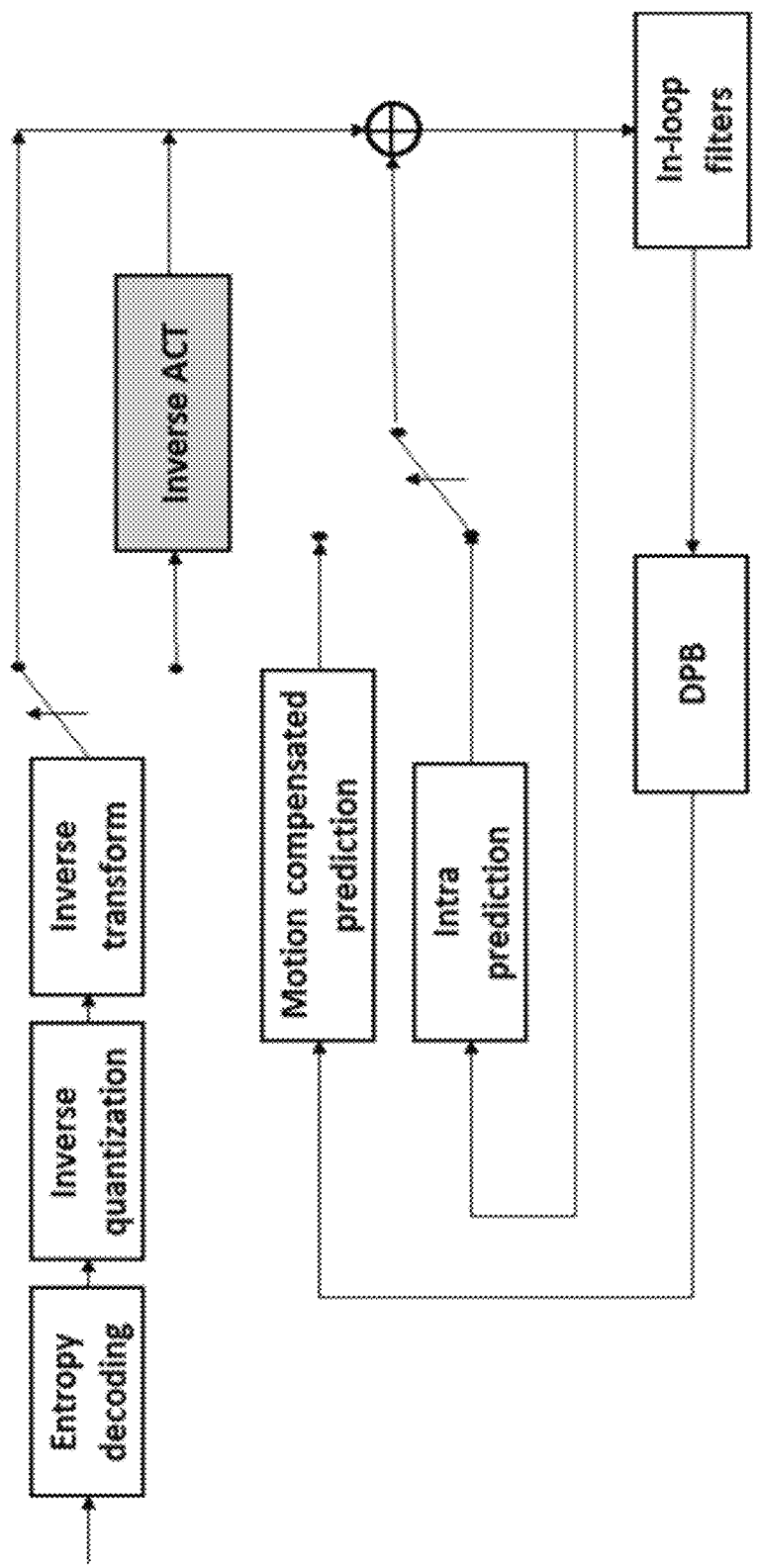
FIG. 6 is an illustration of a decoding process with an adaptive colour transform (ACT).

FIG. 6 illustrates the decoding flowchart with the ACT applied. As illustrated in FIG. 6, the colour space conversion is carried out in residual domain. Specifically, one additional decoding module, namely inverse ACT, is introduced after inverse transform to convert the residuals from YCgCo domain back to the original domain.

In the VVC, unless the maximum transform size is smaller than the width or height of one coding unit (CU), one CU leaf node is also used as the unit of transform processing. Therefore, in the proposed implementation, the ACT flag is signalled for one CU to select the colour space for coding its residuals. Additionally, following the HEVC ACT design, for inter and IBC CUs, the ACT is only enabled when there is at least one non-zero coefficient in the CU. For intra CUs, the ACT is only enabled when chroma components select the same intra prediction mode of luma component, i.e., DM mode.

The core transforms used for the colour space conversions are kept the same as that used for the HEVC. Specifically, the following forward and inverse YCgCo colour transform matrices, as described as follows, are applied.

$$\begin{bmatrix} C_0' \\ C_1' \\ C_2' \end{bmatrix} = \begin{bmatrix} 2 & 1 & 1 \\ 2 & -1 & -1 \\ 0 & -2 & 2 \end{bmatrix} \begin{bmatrix} C_0 \\ C_1 \\ C_2 \end{bmatrix} / 4 \begin{bmatrix} C_0 \\ C_1 \\ C_2 \end{bmatrix} = \begin{bmatrix} 1 & 1 & 0 \\ 1 & -1 & -1 \\ 1 & -1 & 1 \end{bmatrix} \begin{bmatrix} C_0' \\ C_1' \\ C_2' \end{bmatrix}$$

Additionally, to compensate the dynamic range change of residuals signals before and after colour transform, the QP adjustments of (−5, −5, −3) are applied to the transform residuals.

On the other hand, the forward and inverse colour transforms need to access the residuals of all three components. Correspondingly, in the proposed implementation, the ACT is disabled in the following two scenarios where not all residuals of three components are available.
1. Separate-tree partition: when separate-tree is applied, luma and chroma samples inside one CTU are partitioned by different structures. This results in that the CUs in the luma-tree only contains luma component and the CUs in the chroma-tree only contains two chroma components.
2. Intra sub partition prediction (ISP): the ISP sub-partition is only applied to luma while chroma signals are coded without splitting. In the current ISP design, except the last ISP sub-partitions, the other sub-partitions only contain luma component.

2.7 Escape Value Binarization Using EG(k)

When using EG(k) for escape value binarization, when base Qp is large enough (or symbols to be coded are small enough), the bit length of EG(k) cannot be reduced any more. For example, when base Qp>=23, for EG(5), the bit length reaches 6, which is the minimal bit length for EG5. Similarly, when base Qp>=35, the bit length reaches the minimal for EG3. When base Qp>=29, the bit length reaches the minimal for EG4. In such a case, further increasing Qp cannot reduce bit rate but increase distortion. It is a waste of bits.

3 Example Technical Problems Solved by Technical Solutions Described Herein (1) EG(k) as a binarization method for escape values may waste bits when Qp is larger than a threshold.

(2) Palette size may be too large for local dual tree.

(3) Chroma parameters do not need to be signalled when chroma tools are not applied.

4 Example Embodiments and Techniques

The listing of items below should be considered as examples to explain general concepts. These items should not be interpreted in a narrow way. Furthermore, these items can be combined in any manner.

The Following Examples May be Applied on Palette Scheme in VVC and all Other Palette Related Schemes.

1. Qp for escape value reconstruction may have a maximum and/or a minimum allowed value.
   a. In one example, QP may be clipped to be no greater than the maximum allowed value and/or no smaller than the minimum allowed value.
   b. In one example, the maximum allowed Qp for escape value reconstruction may depend on the binarization method.
   c. In one example, the maximum allowed Qp for escape value reconstruction may be (T+B), where B is based on bit depth.
      i. In one example, T may be a constant.
         1. In one example, T may be 23.
         2. In one example, T may be a number less than 23.
         3. In one example, T may be 35.
         4. In one example, T may be a number less than 35.
         5. In one example, T may be 29.
         6. In one example, T may be a number less than 29.
      ii. In one example, T may be indicated in a video region (e.g., sequence, picture, slice/tile/subpicture).
         1. In one example, T may be indicated in VPS/SPS/PPS/PH/SH.
      iii. In one example, B may be set to QpBdOffset (e.g., 6*bit_depth_minus8).
   d. In one example, the maximum allowed Qp for escape value reconstruction may be (23+QpBdOffset).
      i. Alternatively, furthermore, EG5 is used to code the escape values.
      ii. Alternatively, the maximum allowed Qp for escape value reconstruction may be (K+QpBdOffset), where K is a number less than 23.
   e. In one example, the maximum allowed Qp for escape value reconstruction may be (35+QpBdOffset).
      i. Alternatively, furthermore, EG3 is used to code the escape values.
      ii. Alternatively, the maximum allowed Qp for escape value reconstruction may be (K+QpBdOffset), where K is a number less than 35.
   f. Alternatively, the maximum allowed Qp for escape value reconstruction may be (29+QpBdOffset).
      i. Alternatively, furthermore, EG4 is used to code the escape values.
      ii. Alternatively, the maximum allowed Qp for escape value reconstruction may be (K+QpBdOffset), where K is a number less than 29.

Palette Size Related

2. It is proposed that the palette size may be different when local dual tree is applied or not.
   a. In one example, for local dual tree, it is proposed that the palette size may be reduced.
   b. In one example, the palette size for luma CU and chroma CU may be different when local dual tree is applied.
   c. In one example, the palette size for a chroma CU may be reduced compared with the palette size for a luma CU in local dual tree, or compared with the palette size when local dual tree is not applied.
      i. In one example, the palette size for chroma may be reduced by half
3. It is proposed that the palette predictor size may be different when local dual tree is applied or not.
   a. In one example, for local dual tree, it is proposed that the palette predictor size may be reduced.
   b. In one example, the palette predictor size for luma CU and chroma CU may be different when local dual tree is applied.
   c. In one example, the palette predictor size for a chroma CU may be reduced compared with the palette predictor size for a luma CU in local dual tree, or compared with the palette predictor size when local dual tree is not applied.
      i. In one example, the palette predictor size for chroma may be reduced by half.

Chroma Deblocking Related

4. Whether to signal/parse the chroma deblocking offsets at slice level and/or higher level (i.e., region size is larger than a slice) (e.g., in PPS or picture header) may depend on the colour format and/or separate plane coding enabling flag and/or ChromaArrayType and/or a flag that indicates whether chroma deblocking offsets are present and/or a flag that indicates whether chroma deblocking offsets or some other chroma tool parameters are present.
   a. In one example, signalling/parsing of chroma deblocking offsets at slice level and/or higher level (i.e., region size is larger than a slice) may be always skipped when ChromaArrayType is equal to 0 or colour format is 4:0:0 or separate plane coding is applied or a flag indicating that chroma deblocking offsets are not present.
   b. In one example, signalling/parsing of pps_cb_beta_offset_div2, pps_cb_tc_offset_div2, pps_cr_beta_offset_div2, pps_cr_tc_offset_div2 may be always skipped when ChromaArrayType is equal to 0 or colour format is 4:0:0 or separate plane coding is applied or a flag indicating that chroma deblocking offsets are not present.
   c. In one example, signalling/parsing of ph_cb_beta_offset_div2, ph_cb_tc_offset_div2, ph_cr_beta_offset_div2, ph_cr_tc_offset_div2 may be always skipped when ChromaArrayType is equal to 0 or colour format is 4:0:0 or separate plane coding is applied or a flag indicating that chroma deblocking offsets are not present.
   d. In one example, signalling/parsing of slice_cb_beta_offset_div2, slice_cb_tc_offset_div2, slice_cr_beta_offset_div2, slice_cr_tc_offset_div2 may be always skipped when ChromaArrayType is equal to 0 or colour format is 4:0:0 or separate plane coding is applied or a flag indicating that chroma deblocking offsets are not present.
   e. Alternatively, a conformance bitstream may satisfy that when ChromaArrayType is equal to 0 or colour format is 4:0:0 or separate plane coding is applied, pps_cb_beta_offset_div2, pps_cb_tc_offset_div2, pps_cr_beta_offset_div2, pps_cr_tc_offset_div2 may be equal to 0.

f. In one example, signalling/parsing of pps_cb_beta_offset_div2, pps_cb_tc_offset_div2, pps_cr_beta_offset_div2, pps_cr_tc_offset_div2 may be always skipped when chroma_format_idc is equal to 0 and separate colour plane flag is not equal to 1 or a flag indicating that chroma deblocking offsets are not present.

g. In one example, signalling/parsing of pps_cb_beta_offset_div2, ph_cb_tc_offset_div2, ph_cr_beta_offset_div2, ph_cr_tc_offset_div2 may be always skipped when chroma_format_idc is equal to 0 and separate colour plane flag is not equal to 1 or a flag indicating that chroma deblocking offsets are not present.

h. In one example, signalling/parsing of slice_cb_beta_offset_div2, slice_cb_tc_offset_div2, slice_cr_beta_offset_div2, slice_cr_tc_offset_div2 may be always skipped when chroma_format_idc is equal to 0 and separate colour plane flag is not equal to 1 or a flag indicating that chroma deblocking offsets are not present.

i. Alternatively, furthermore, when signalling of a syntax element is skipped, the value of the syntax element is inferred to be equal to 0.

5. Colour format and/or separate plane coding enabling flag and/or ChromaArrayType and/or a flag that indicates whether chroma deblocking offsets are present and/or a flag that indicates whether chroma deblocking offsets or some other chroma tool parameters are present (e.g., pps_chroma_tool_params_present_flag) may be indicated in PPS and/or SPS and/or APS.

a. In one example, signalling/parsing of pps_cb_beta_offset_div2, pps_cb_tc_offset_div2, pps_cr_beta_offset_div2, pps_cr_tc_offset_div2 may be always skipped when ChromaArrayType is equal to 0 or colour format is 4:0:0 and/or the flag is false.

b. In one example, signalling/parsing of pps_cb_beta_offset_div2, pps_cb_tc_offset_div2, pps_cr_beta_offset_div2, pps_cr_tc_offset_div2 may be always skipped when ChromaArrayType is equal to 0 or colour format is 4:0:0 and/or the flag is false.

c. In one example, chroma tool offsets related syntax elements (e.g., pps_cb_qp_offset, pps_cr_qp_offset, pps_joint_cbcr_qp_offset_present_flag, pps_slice_chroma_qp_offsets_present_flag, pps_cu_chroma_qp_offset_list_enabled_flag) are signalled under the condition check of ChromaArrayType being unequal to 0 and/or the flag is false.

d. In a conformance bitstream, the colour format and/or separate plane coding enabling flag and/or ChromaArrayType signalled in PPS may be identical to the corresponding information signalled in the associated SPS.

6. It is proposed that the flag to control if chroma qp offset should be signalled/parsed may also control if chroma deblocking offsets should be signalled/parsed.

a. In one example, the flag pps_chroma_tool_params_present_flag may be used to control whether chroma qp offset should be signalled parsed and whether chroma deblocking offsets should be signalled/parsed (for example, as shown in Embodiment 3). Alternatively, the existing flag pps_chroma_tool_offsets_present_flag can be used to control whether chroma qp offset should be signalled parsed and whether chroma deblocking offsets should be signalled/parsed.

7. A controlling flag, e.g. pps_chroma_deblocking_params_present_flag, may be added in PPS to control whether chroma deblocking offsets should be signalled/parsed.

a. In one example, when the flag is equal to 0, signalling/parsing of pps_cb_beta_offset_div2, pps_cb_tc_offset_div2, pps_cr_beta_offset_div2, pps_cr_tc_offset_div2 may be always skipped.

b. In one example, when the flag is equal to 0, signalling/parsing of ph_cb_beta_offset_div2, ph_cb_tc_offset_div2, ph_cr_beta_offset_div2, ph_cr_tc_offset_div2 may be always skipped.

c. In one example, when the flag is equal to 0, signalling/parsing of slice_cb_beta_offset_div2, slice_cb_tc_offset_div2, slice_cr_beta_offset_div2, slice_cr_tc_offset_div2 may be always skipped.

d. Alternatively, furthermore, in a conformance bitstream, the flag may equal to 0 when ChromaArrayType is equal to 0.

Chroma Tool Related Parameters in APS

8. A controlling flag, e.g. aps_chroma_tool_params_present_flag, may be added in APS to control whether chroma tool related parameters should be signalled/parsed in APS.

a. In one example, when aps_chroma_tool_params_present_flag is equal to 0, alf_chroma_filter_signal_flag, alf_cc_cb_filter_signal_flag and alf_cc_cr_filter_signal_flag may be always skipped and inferred to be equal to 0.

b. In one example, when aps_chroma_tool_params_present_flag is equal to 0, scaling_list_chroma_present_flag may be always skipped and inferred to be equal to 0.

Other Chroma Tool Related Parameters in Picture Header

9. In one example, signalling/parsing of ph_log_2_diff_min_qt_min_cb_intra_slice_luma may be always skipped when ChromaArrayType is equal to 0 or colour format is 4:0:0 or separate plane coding is applied or a flag indicating that this syntax element (and possibly also other syntax elements) is not present.

10. In one example, signalling/parsing of ph_log_2_diff_min_qt_min_cb_intra_slice_chroma may be always skipped when ChromaArrayType is equal to 0 or colour format is 4:0:0 or separate plane coding is applied or a flag indicating that this syntax element (and possibly also other syntax elements) is not present.

11. In one example, signalling/parsing of ph_log_2_diff_min_qt_min_cb_inter_slice may be always skipped when ChromaArrayType is equal to 0 or colour format is 4:0:0 or separate plane coding is applied or a flag indicating that this syntax element (and possibly also other syntax elements) is not present.

General Features

12. Whether and/or how to apply the above methods may be based on:

a. Video contents (e.g. screen contents or natural contents)

b. A message signalled in the decoder parameter set/sequence parameter set (SPS)/video parameter set (VPS)/picture parameter set (PPS)/adaptation parameter set (APS)/picture header/slice header/tile group header/Largest coding unit (LCU)/Coding unit (CU)/LCU row/group of LCUs/transform unit (TU)/prediction unit (PU) block/Video coding unit c. Position of CU/PU/TU/block/Video coding unit d. Block dimension of current block and/or its neighboring blocks
e. Block shape of current block and/or its neighboring blocks
f Quantization parameter of the current block
g. Indication of the colour format (such as 4:2:0, 4:4:4, RGB or YUV)
h. Coding tree structure (such as dual tree or single tree)
i. Slice/tile group type and/or picture type
j. Colour component (e.g. may be only applied on luma component and/or chroma component)
k. Temporal layer ID
l. Profiles/Levels/Tiers of a standard
m. Whether the current block has one escape sample or not.
   i. In one example, the above methods may be applied only when the current block has one escape sample at least.
n. Whether current block is coded with lossless mode or not (e.g., cu_transquant_bypass_flag).
   ii. In one example, the above methods may be applied only when the current block is NOT coded with lossless mode.
o. Whether lossless coding is enabled or not (e.g., transquant_bypass_enabled, cu_transquant_bypass_flag).

5 Embodiments

In the embodiments below, the added portions are marked as bold, underlined, and italicized texts. The deleted portions are marked within [[ ]].

5.1 Embodiment #1

8.4.5.3 Decoding Process for Palette Mode
If bIsEscapeSample is equal to 0, the following applies:

recSamples[x][y]=CurrentPaletteEntries[cIdx][PaletteIndexMap[xCbL+xL][yCbL+yL]]   (443)

Otherwise (bIsEscapeSample is equal to 1), the following ordered steps apply:
1. The quantization parameter qP is derived as follows:
   If cIdx is equal to 0, $qP=$ _Min(_ $\mathrm{Max}(QpPrimeTsMin,Qp'Y)$
        _, 23 + QpBdOffset )_   (444)

Otherwise, if cIdx is equal to 1, $qP=\mathrm{Min}(\mathrm{Max}(QpPrimeTsMin,Qp'Cb),$
        _, 23 + QpBdOffset )_   (445)

Otherwise (cIdx is equal to 2), $qP=$ _Min(_ $\mathrm{Max}(QpPrimeTsMin,Qp'Cr),$
        _, 23 + QpBdOffset )_   (446)

2. The list levelScale[ ] is specified as levelScale[k]={40, 45, 51, 57, 64, 72} with k=0..5.
3. The following applies:

$tmpVal=(PaletteEscapeVal[cIdx][xCbL+xL][yCbL+yL]$
        $*levelScale[qP\ \%\ 6])<<(qP/6)+32)>>6$   (447)

recSamples[x][y]=Clip3(0,(1<<BitDepth)−1,tmpVal)   (448)

5.2 Embodiment #2

7.3.2.4 Picture Parameter Set RBSP Syntax

| pic_parameter_set_rbsp( ) { | Descriptor |
|---|---|
| ... | |
| deblocking_filter_control_present_flag | u(1) |
| if( deblocking_filter_control_present_flag ) { | |
|   deblocking_filter_override_enabled_flag | u(1) |
|   pps_deblocking_filter_disabledflag | u(1) |
|   if( !pps_deblocking_filter_disabled flag ) { | |
|     pps_beta_offset_div2 | se(v) |
|     pps_tc_offset_div2 | se(v) |
|     _if( pps_chroma_tool offsets_present_flag ) {_ | |
|       pps_cb_beta_offset_div2 | se(v) |
|       pps_cb_tc_offset_div2 | se(v) |
|       pps_cr_beta_offset_div2 | se(v) |
|       pps_cr_tc_offset_div2 | se(v) |
|     _}_ | |
|   } | |
| } | |
| ... | |

7.3.2.7 Picture Header Structure Syntax

| picture_header_structure( ) { | Descriptor |
|---|---|
| ... | |
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       _if( pps_chroma_tool offsets_present_flag ) {_ | |
|         ph_cb_beta_offset_div2 | se(v) |
|         ph_cb_tc_offset_div2 | se(v) |
|         ph_cr_beta_offset_div2 | se(v) |
|         ph_cr_tc_offset_div2 | se(v) |
|       _}_ | |
|     } | |
|   } | |
| } | |
| ... | |

7.3.7.1 General Slice Header Syntax

| slice_header( ) { | Descriptor |
|---|---|
| ... | |
| if( deblocking_filter_override_enabled_flag && !dbf_info_in_ph_flag ) | |
|   slice_deblocking_filter_override_flag | u(1) |
| if( slice_deblocking_filter_override_flag) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|     _if( pps_chroma_tool offsets_present_flag ) {_ | |
|       slice_cb_beta_offset_div2 | se(v) |
|       slice_cb_tc_offset_div2 | se(v) |
|       slice_cr_beta_offset_div2 | se(v) |
|       slice_cr_tc_offset_div2 | se(v) |
|     _}_ | |
|   } | |
| } | |
| ... | |

5.3 Embodiment #3

7.4.2.4 Picture Parameter Set RBSP Syntax

| pic_parameter_set_rbsp( ) { | Descriptor |
|---|---|
| ... | |
| dps_chroma_tool _params[[offsets]]_present_flag | u(1) |
| if( pps_chroma_tool_params[[offsets]]_present_flag ) { | |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag) | |
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
| } | |
| if( pps_cu_chroma_qp_offset_list_enabled_flag ) { | |
|   chroma_qp_offset_list_len_minus1 | ue(v) |
|   for( i = 0; i <= chroma_qp_offset_list_len_minus1; i++ ) { | |
|     cb_qp_offset_list[ i ] | se(v) |
|     cr_qp_offset_list[ i ] | se(v) |
|     if( pps_joint_cbcr_qp_offset_present_flag ) | |
|       joint_cbcr_qp_offset_list[ i ] | se(v) |
|   } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     *if( pps_chroma_tool_params_present_flag ) {* | |
|     pps_cb_beta_offset_div2 | se(v) |
|     pps_cb_tc_offset_div2 | se(v) |
|     pps_cr_beta_offset_div2 | se(v) |
|     pps_cr_tc_offset_div2 | se(v) |
|     } | |
|   } | |
| } | |
| ... | |

7.3.2.5 Adaptation Parameter Set RBSP Syntax

| adaptation_parameter_set_rbsp( ) { | Descriptor |
|---|---|
| adaptation_parameter_set_id | u(5) |
| aps_params_type | u(3) |
| *aps_chroma_tool_params_present_flag* | *u(1)* |
| if( aps_params_type == ALF_APS ) | |
|   alf_data( ) | |
| else if( aps_params_type == LMCS_APS ) | |
|   lmcs_data( ) | |
| else if( aps_params_type == SCALING_APS ) | |
|   scaling_list_data( ) | |
| aps_extension_flag | u(1) |
| if( aps_extension_flag ) | |
|   while( more_rbsp_data( ) ) | |
|     aps_extension_data_flag | u(1) |
| rbsp_trailing_bits( ) | |
| } | |

7.3.2.7 Picture Header Structure Syntax

| picture_header_structure( ) { | Descriptor |
|---|---|
| ... | |
| if( ph_alf_chroma_idc *≥ 0*) | |
|   ph_alf_aps_id_chroma | u(3) |
| ... | |
| if( ph_intra_slice_allowed_flag ) { | |
|   if( partition_constraints_override_flag ) { | |
|   *if( ChromaArrayType != 0 )* | |
|     ph_log2_diff_min_qt_min_cb_intra_slice_luma | ue(v) |
|     ph_max_mtt_hierarchy_depth_intra_slice_luma | ue(v) |
|     if( ph_max_mtt_hierarchy_depth_intra_slice_luma != 0 ) { | |
|       ph_log2_diff_max_bt_min_qt_intra_slice_luma | ue(v) |
|       ph_log2_difT_max_tt_min_qt_intra_slice_luma | ue(v) |
|     } | |
|     if( qtbtt_dual_tree_intra_flag ) { | |
|     *if( ChromaArrayType != 0 )* | |
|       ph_log2_diff_min_qt_min_cb_intra_slice_chroma | ue(v) |
|       ph_max_mtt_hierarchy_depth_intra_slice_chroma | ue(v) |
|       if( ph_max_mtt_hierarchy_depth_intra_slice_chroma != 0 ) { | |
|         ph_log2_diff_max_bt_min_qt_intra_slice_chroma | ue(v) |
|         ph_log2_diff_max_tt_min_qt_intra_slice_chroma | ue(v) |
|       } | |
|     } | |
|   } | |
|   if( cu_qp_delta_enabled_flag) | |
|     ph_cu_qp_delta_subdiv_intra_slice | ue(v) |
|   if( pps_cu_chroma_qp_offset_list_enabled_flag ) | |
|     ph_cu_chroma_qp_offset_subdiv_intra_slice | ue(v) |
| } | |
| if( ph_inter_slice_allowed_flag) { | |
|   if( partition_constraints_override_flag ) { | |
|   *if( ChromaArrayType != 0 )* | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter_slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
|   if( cu_qp_delta_enabled_flag) | |

| picture_header_structure( ) { | Descriptor |
|---|---|
|     ph_cu_qp_delta_subdiv_inter_slice | ue(v) |
|     if( pps_cu_chroma_qp_offset_list_enabled_flag ) | |
|     ph_cu_chroma_qp_offset_subdiv_inter_slice | ue(v) |
|     if( sps_temporal_mvp_ enabled_flag ) { | |
|     ph_temporal_mvp_enabled_flag | u(1) |
|     if( ph_temporal_mvp_enabled_flag && rpl_info_in_ph_flag ) { | |
|       ( ph_collocated_from_l0_flag | u(1) |
|       if (( ph_collocated_from_l0_flag && | |
|         num_ref_entries[ 0 ][ PicRplsIdx[ 0 ] ] > 1 ) \|\| | |
|         (!ph_collocated_from_l0_flag && | |
|         num_ref_entries[ 1 ][ PicRplsIdx[ 1 ] ] > 1 ) ) | |
|       ph_collocated_ref_idx | ue(v) |
|     } | |
|     } | |
|     mvd_l1_zero_flag | u(1) |
|     if( sps_fpel_mmvd_enabled_flag) | |
|     ph_fpel_mmvd_enabled_flag | u(1) |
|     if( sps_bdof_pic_present_flag ) | |
|     ph_disable_bdof_flag | u(1) |
|     if( sps_dmvr_pic_present_flag ) | |
|     ph_disable_dmvr_flag | u(1) |
|     if( sps_prof_pic_present_flag ) | |
|     ph_disable_prof_flag | u(1) |
|     if( ( pps_weighted_pred_flag \|\| pps_weighted_bipred_flag ) && | |
|     wp_info_in_ph_flag ) | |
| pred_weight_table( ) | |
| } | |
| if( qp_delta_info_in_ph_flag ) | |
|     ph_qp_delta | se(v) |
| if( sps_joint_cbcr_enabled_flag) | |
|     ph_joint_cbcr_sign_flag | u(1) |
| if( sps_sao_enabled_flag && sao_info_in_ph_flag ) { | |
|     ph_sao_luma_enabled_flag | u(1) |
|     if( ChromaArrayType != 0 ) | |
|     ph_sao_chroma_enabled_flag | u(1) |
| } | |
| if( sps_dep_quant_enabled_flag) | |
|     ph_dep_quant_enabled_flag | u(1) |
| if( sps_sign_data_hiding_enabled_flag && !ph_dep_quant_enabled_flag ) | |
|     pic_sign_data_hiding_enabled_flag | u(1) |
| if( deblocking_filter_override_enabled_flag && dbf_info_in_ph_flag ) { | |
|     ph_deblocking_filter_override_flag | u(1) |
|     if( ph_deblocking_filter_override_flag) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       *if( ChromaArrayType != 0 ) {* | |
|         ph_cb_beta_offset_div2 | se(v) |
|         ph_cb_tc_offset_div2 | se(v) |
|         ph_cr_beta_offset_div2 | se(v) |
|         ph_cr_tc_offset_div2 | se(v) |
|       *}* | |
|     } | |
|     } | |
| } | |
| if( picture_header_extension_present_flag ) { | |
|     ph_extension_length | ue(v) |
|     for( i = 0; i < ph_extension_length; i++) | |
|     ph_extension_data_byte[ i ] | u(8) |
| } | |
| } | |

7.3.2.19 Adaptive Loop Filter Data Syntax

| alf_data( ) { | Descriptor |
|---|---|
|   alf_luma_filter_signal_flag | u(1) |
|   *if( aps_chroma_tool_ params_present_flag ) {* | |
|     alf_chroma_filter_signal_flag | u(1) |
|     alf_cc_cb_filter_signal_flag | u(1) |
|     alf_cc_cr_filter_signal_flag | u(1) |
|   *}* | |
| ... | |

7.3.2.21 Scaling List Data Syntax

| scaling_list_data( ) { | Descriptor |
|---|---|
|   scaling_matrix_for_lfnst_disabled_flag | u(1) |
|   *if( aps_chroma_tool_params_present_flag )* | |
|     scaling_list_chroma_present_flag | u(1) |
| ... | |

7.3.7.1 General Slice Header Syntax

| slice_header( ) { | Descriptor |
|---|---|
| ... | |
|   if( deblocking_filter_override_enabled_flag && | |
|   !dbf_info_in_ph_flag ) | |
|     slice_deblocking_filter_override_flag | u(1) |
|   if( slice_deblocking_filter_override_flag) { | |
|     slice_deblocking_filter_disabled_flag | u(1) |
|     if( !slice_deblocking_filter_disabled_flag ) { | |
|       slice_beta_offset_div2 | se(v) |
|       slice_tc_offset_div2 | se(v) |
|       *if( ChromaArrayType != 0 )* | |
|         slice_cb_beta_offset_div2 | se(v) |
|         slicecb_tc_offset_div2 | se(v) |
|         slice_cr_beta_offset_div2 | se(v) |
|         slice_cr_tc_offset_div2 | se(v) |
|       *}* | |
|     } | |
|   } | |

7.4.3.4 Picture Parameter Set RBSP Semantics pps_chroma_tool *params* [[offsets]]_present_flag equal to 1 specifies that chroma tool [[offsets]] related syntax elements are present in the PPS RBSP syntax structure. pps_chroma_tool *params* [[offsets]]_present_flag equal to 0 specifies that chroma tool [[offsets]] related syntax elements are not present in the PPS RBSP syntax structure. When ChromaArrayType is equal to 0, the value of pps_chroma_tool *params* [[offsets]]_present_flag may be equal to 0.

7.4.3.5 Adaptive Parameter Set Semantics *aps_chroma_tool_params _present_flag equal to 1 specifies that chroma tool related syntax elements are present in the APS RBSP syntax structure. aps_chroma_tool_params_present_flag equal to 0 specifies that chroma tool related syntax elements are not present in the APS RBSP syntax structure. When ChromaArrayType is equal to 0, the value of aps_chroma_tool_params_present_flag may be equal to 0.*

5.4 Embodiment #4

7.4.2.4 Picture Parameter Set RBSP Syntax

| | Descriptor |
|---|---|
| pic_parameter_set_rbsp( ) { | |
|   ...... | |
|   deblocking_filter_control_present_flag | u(1) |
|   if( deblocking_filter_control_present_flag ) { | |
|     *pps_chroma deblocking_params_present_flag* | *u(1)* |
|     deblocking_filter_override_enabled_flag | u(1) |
|     pps_deblocking_filter_disabled_flag | u(1) |
|     if( !pps_deblocking_filter_disabled_flag ) { | |
|       pps_beta_offset_div2 | se(v) |
|       pps_tc_offset_div2 | se(v) |
|       *if( pps_chroma_ deblocking_params_present_flag ) {* | |
|         pps_cb_beta_offset_div2 | se(v) |
|         pps_cb_tc_offset_div2 | se(v) |
|         pps_cr_beta_offset_div2 | se(v) |
|         pps_cr_tc_offset_div2 | se(v) |
|       *}* | |
|     } | |
|   } | |
|   ...... | |

7.3.2.7 Picture Header Structure Syntax

| | Descriptor |
|---|---|
| picture_header_structure( ) { | |
|   ...... | |
|   if( deblocking_filter_override_enabled_flag && dbf_info_in_ph_flag ) { | |
|     ph_deblocking_filter_override_flag | u(1) |
|     if( ph_deblocking_filter_override_flag ) { | |
|       ph_deblocking_filter_disabled_flag | u(1) |
|       if( !ph_deblocking_filter_disabled_flag ) { | |
|         ph_beta_offset_div2 | se(v) |
|         ph_tc_offset_div2 | se(v) |
|         *if( pps_chroma deblocking_params_present_flag ) {* | |
|           ph_cb_beta_offset_div2 | se(v) |
|           ph_cb_tc_offset_div2 | se(v) |
|           ph_cr_beta_offset_div2 | se(v) |
|           ph_cr_tc_offset_div2 | se(v) |
|         *}* | |
|       } | |
|     } | |
|   } | |
|   if( picture_header_extension_present_flag ) { | |
|     ph_extension_length | ue(v) |
|     for( i = 0; i < ph_extension_length; i++) | |
|       ph_extension_data_byte[ i ] | u(8) |
|   } | |
| } | |

7.3.7.1 General Slice Header Syntax

| slice_header( ) { | Descriptor |
|---|---|
|   ...... | |
|   if( deblocking_filter_override_enabled_flag && | |
|   !dbf_info_in_ph_flag ) | |
|     slice_deblocking_filter_override_flag | u(1) |
|   if( slice_deblocking_filter_override_flag ) { | |
|     slice_deblocking_filter_disabled_flag | u(1) |
|     if( ! slice_deblocking_filter_disabled_flag ) { | |
|       slice_beta_offset_div2 | se(v) |
|       slice_tc_offset_div2 | se(v) |
|       *if( pps_chroma deblocking_params_present_flag ) {* | |

-continued

| | Descriptor |
|---|---|
| slice_cb_beta_offset_div2 | se(v) |
| slice_cb_tc_offset_div2 | se(v) |
| slice_cr_beta_offset_div2 | se(v) |
| slice_cr_tc_offset_div2 | se(v) |
| } | |
| } | |
| } | |
| ...... | |

7.4.3.4 Picture Parameter Set RBSP Semantics

*pps_chroma_deblocking_params_present_flag* equal to 1 specifies that chroma deblocking related syntax elements are present in the PPS RBSP syntax structure. pps_chroma_deblocking_params_present_flag equal to 0 specifies that chroma deblocking related syntax elements are not present in the PPS RBSP syntax structure. When ChromaArrayType is equal to 0, the value of pps_chroma_deblocking_params_present_flag may be equal to 0.

Figure 7:
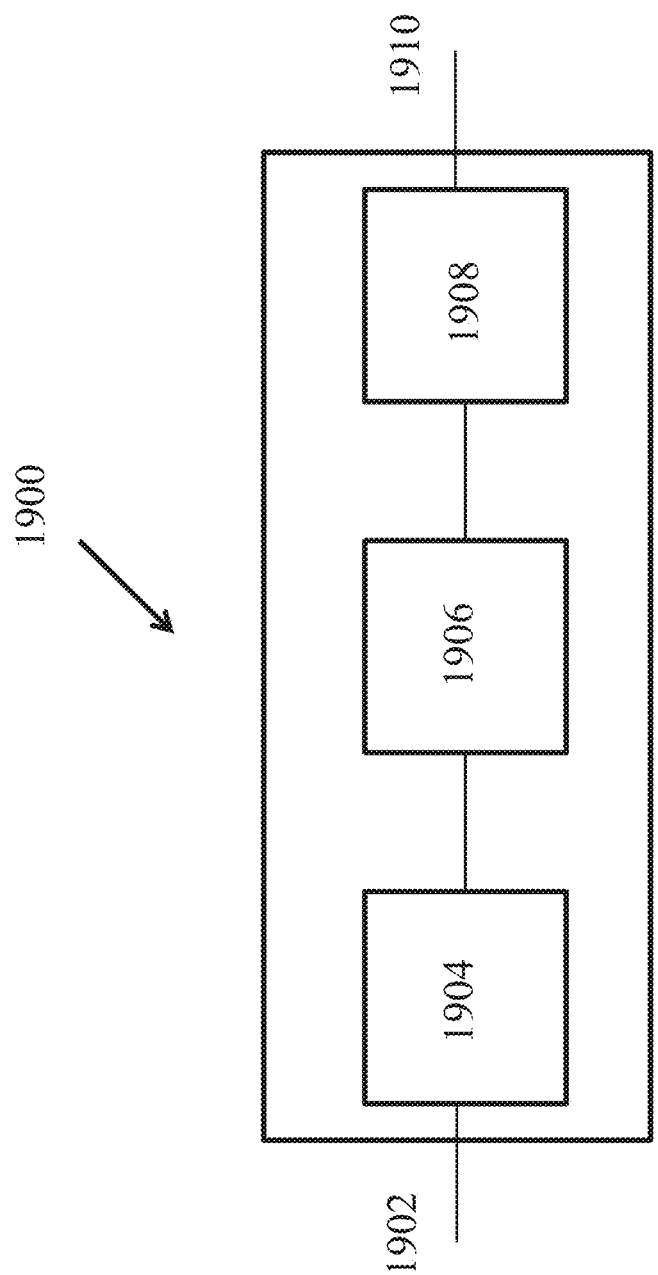
FIG. 7 is a block diagram of an example video processing system.

FIG. 7 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 8:
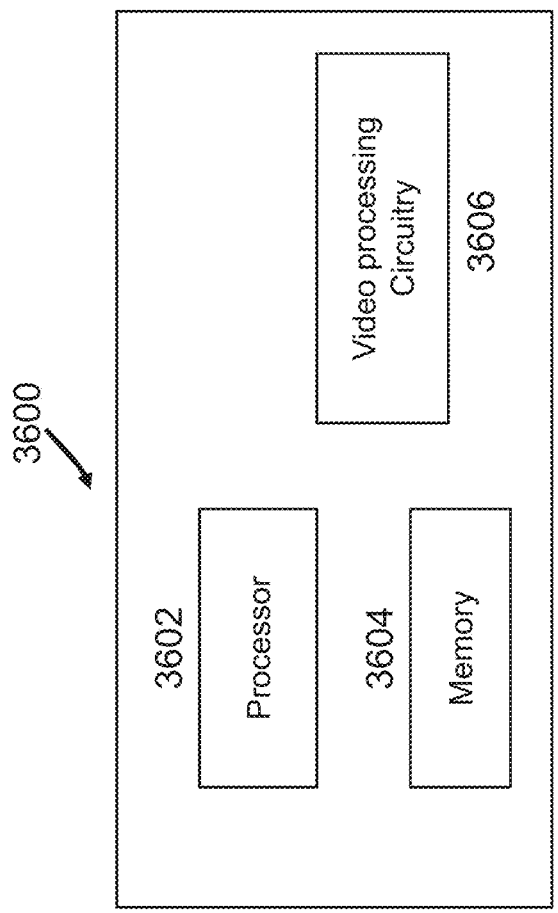
FIG. 8 is a block diagram of a video processing apparatus.

FIG. 8 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 10:
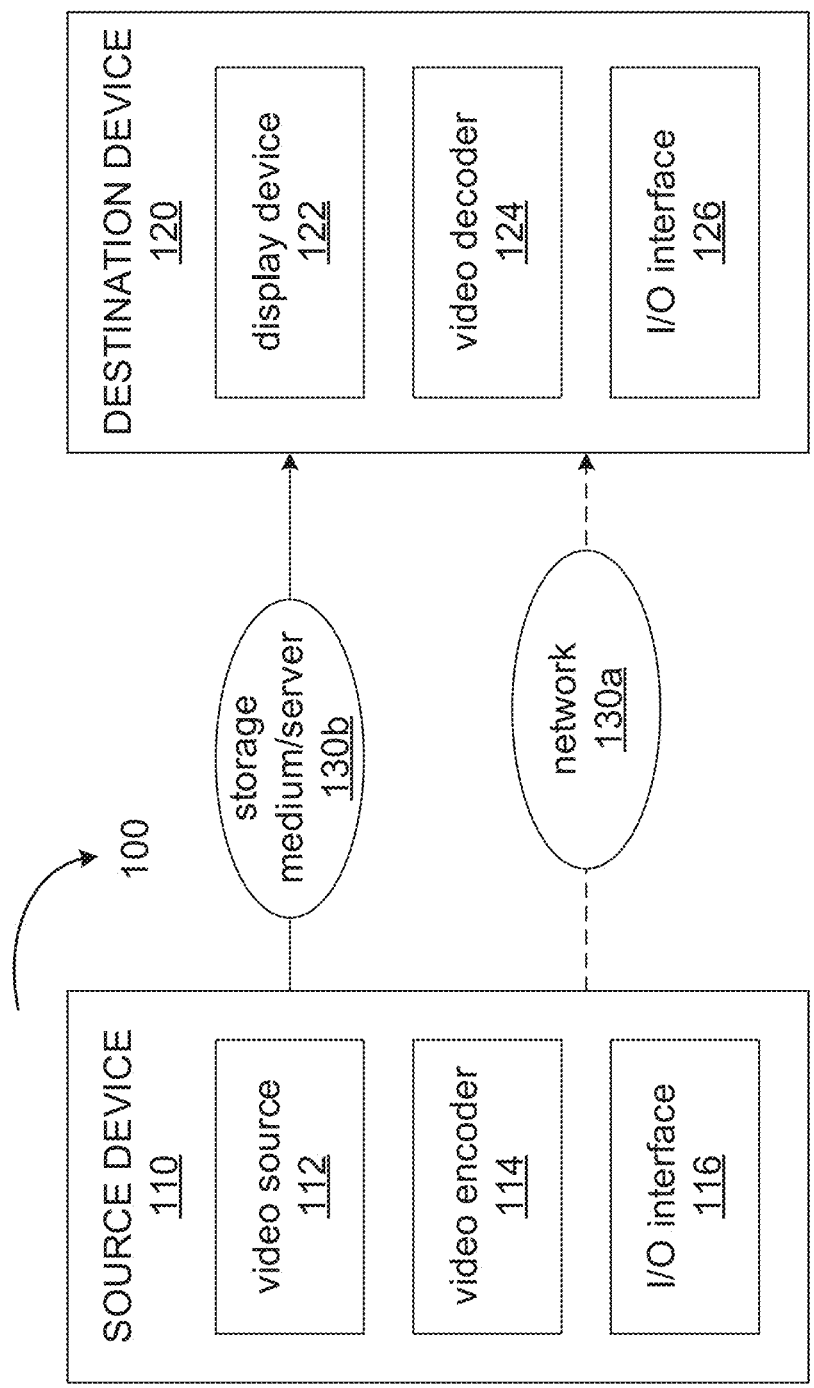
FIG. 10 is a block diagram that illustrates a video coding system according to various embodiments of the disclosure.

FIG. 10 is a block diagram that illustrates an example video coding system 100 that may utilize the techniques of this disclosure.

As shown in FIG. 10, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 11:
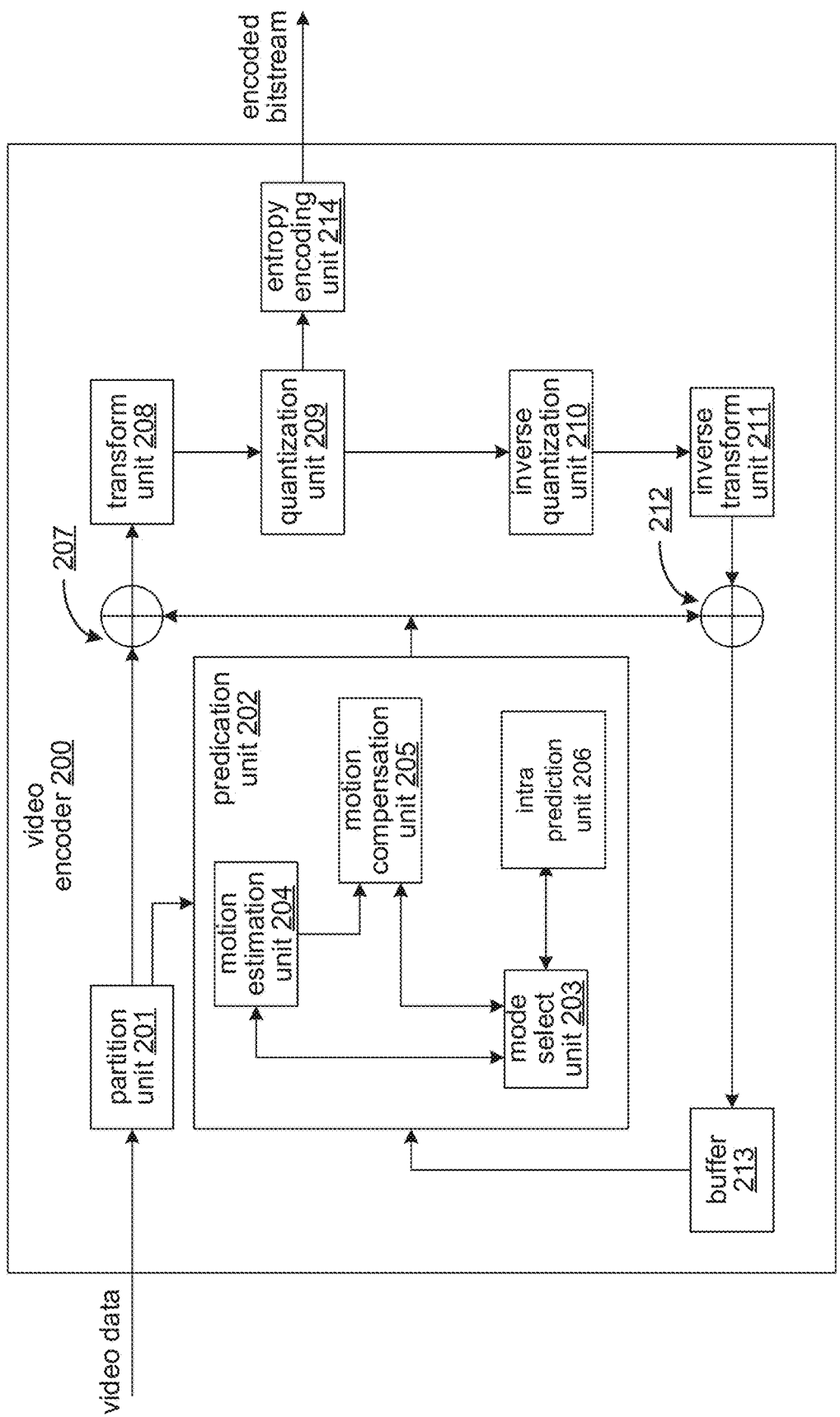
FIG. 11 is a block diagram that illustrates an encoder according to various embodiments of the disclosure.

FIG. 11 is a block diagram illustrating an example of video encoder 200, which may be video encoder 114 in the system 100 illustrated in FIG. 10.

Video encoder 200 may be configured to perform any or all of the techniques of this disclosure. In the example of FIG. 11, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205, an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 11 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the other video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector predication (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed to reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 12:
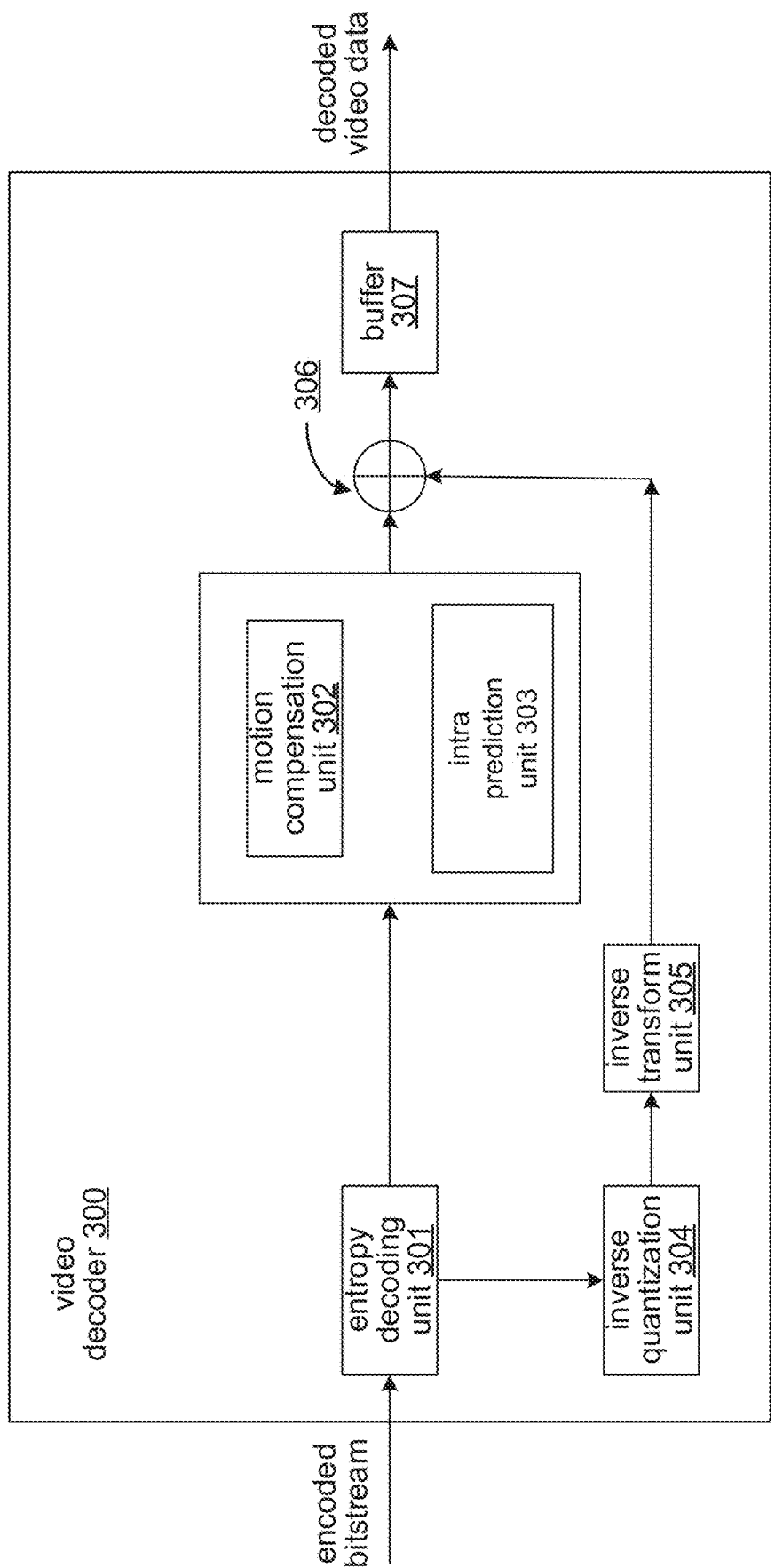
FIG. 12 is a block diagram that illustrates a decoder according to various embodiments of the disclosure.

FIG. 12 is a block diagram illustrating an example of video decoder 300 which may be video decoder 124 in the system 100 illustrated in FIG. 10.

The video decoder 300 may be configured to perform any or all of the techniques of this disclosure. In the example of FIG. 12, the video decoder 300 includes a plurality of functional components. The techniques described in this disclosure may be shared among the various components of the video decoder 300. In some examples, a processor may be configured to perform any or all of the techniques described in this disclosure.

In the example of FIG. 12, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 11).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

The following solutions show example embodiments of techniques discussed in the previous section (e.g., item 1).

Figure 9:
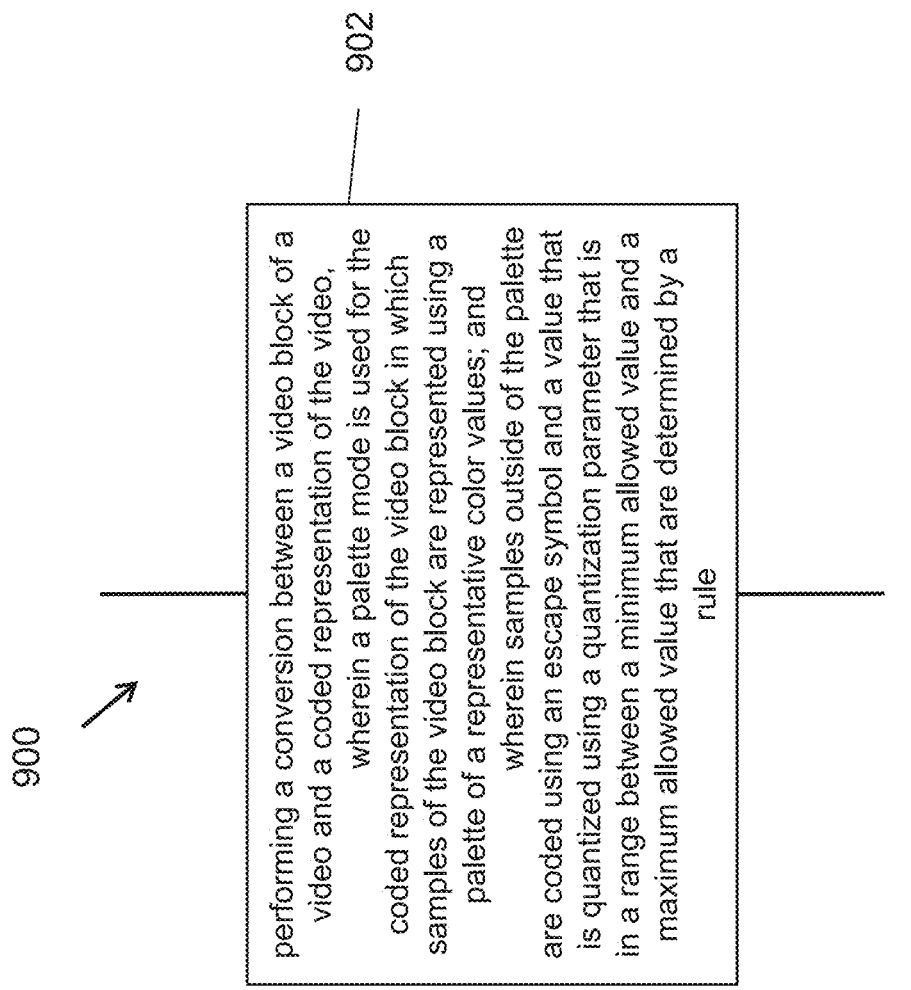
FIG. 9 is a flowchart for an example method of video processing.

1. A method of video processing (e.g., method 900 depicted in FIG. 9), comprising: performing (902) a conversion between a video block of a video and a coded representation of the video, wherein a palette mode is used for the coded representation of the video block in which samples of the video block are represented using a palette of a representative colour values; and wherein samples outside of the palette are coded using an escape symbol and a value that is quantized using a quantization parameter that is in a range between a minimum allowed value and a maximum allowed value that are determined by a rule.

2. The method of solution 1, wherein the maximum allowed value depends on a binarization method used for the coded representation of the video block.

3. The method of solution 1, wherein the maximum allowed value is represented as T+B, where B is a number based on a bit depth of representation of the samples of the video block and T is a pre-defined number.

The following solutions show example embodiments of techniques discussed in the previous section (e.g., item 2).

4. A method of video processing, comprising: performing a conversion between a video block of a video and a coded representation of the video, wherein a palette mode is used for the coded representation of the video block in which samples of the video block are represented using a palette of a representative colour values; and wherein a size of the palette is depended on a rule about whether local dual tree is used for the conversion between the video block and the coded representation.

5. The method of solution 4, wherein the size of the palette depends on a colour component of the video due to use of the local dual tree.

6. The method of solution 5, the rule specifies to use a smaller palette size in case the video block is a chroma block than a case in which the video block is a luma block.

The following solutions show example embodiments of techniques discussed in the previous section (e.g., item 3).

7. A method of video processing, comprising: performing a conversion between a video block of a video and a coded representation of the video, wherein a palette mode is used for the coded representation of the video block in which samples of the video block are represented using a palette of a representative colour values; and wherein a size of the palette predictor is depended on a rule about whether local dual tree is used for the conversion between the video block and the coded representation.

8. The method of solution 7, wherein the size of the palette predictor depends on a colour component of the video block due to use of the local dual tree.

9. The method of solution 8, the rule specifies a smaller palette size in case the video block is a chroma block than a case in which the video block is a luma block.

The following solutions show example embodiments of techniques discussed in the previous section (e.g., item 4).

10. A method of video processing, comprising: determining, for a conversion between a video block of a video region of a video and a coded representation of the video, based on a coding condition, whether a syntax element identifying a deblocking offset for a chroma component of the video is included in the coded representation at the video region level; and performing the conversion based on the determining; wherein the deblocking offset is used to selectively enable a deblocking operation on the video block.

11. The method of solution 10, wherein the video region is a video slice or a video picture.

12. The method of any of solutions 10-11, wherein the coding condition comprises a colour format of the video.

13. The method of any of solutions 10-12, wherein the coding condition is based on whether separate plane coding is enabled for the conversion.

14. The method of any of solutions 10-13, wherein the coding condition is based on whether a chroma array type is included in the coded representation.

The following solutions show example embodiments of techniques discussed in the previous section (e.g., item 5).

15. A method of video processing, comprising: determining, for a conversion between a video block of a video region of a video and a coded representation of the video, based on a coding condition, whether a syntax element identifying use of a chroma coding tool is included in the coded representation at the video region level; and performing the conversion based on the determining; wherein the deblocking offset is used to selectively enable a deblocking operation on the video block.

16. The method of solution 15, wherein the video region is a video slice or a video picture.

17. The method of any of solutions 15-16, wherein the coding condition corresponds to inclusion of a syntax element in an adaptation parameter set.

The following solutions show example embodiments of techniques discussed in the previous section (e.g., items 6, 7).

18. A method of video processing, comprising: performing a conversion between a video block of a video region of a video and a coded representation of the video, wherein the coded representation conforms to a format; wherein the format specifies that whether a first flag indicating a deblocking offset for a chroma component of the video is included in the coded representation is based on whether a second flag indicating a quantization parameter offset of the chroma component is included in the coded representation.

19. The method of solution 18, wherein the format rule specifies that the coded representation includes a third flag indicative of whether the first flag and the second flag are includes in the coded representation.

20. The method of any of solutions 18-19, wherein the third flag is included in the coded representation in a picture parameter set.

The following solutions show example embodiments of techniques discussed in the previous section (e.g., items 8-12).

21. A method of video processing, comprising: performing a conversion between a video block of a video region of a video and a coded representation of the video, wherein the coded representation conforms to a format rule; wherein the format rule specifies that a syntax element in the coded representation controls whether one or more parameters indicating applicability of one or more chroma coding tools are included in the coded representation at the video region or the video block level.

22. The method of solution 21, wherein the syntax element is included in an adaptation parameter set.

23. The method of any of solutions 21-22, wherein the format rule specifies that a first value of the syntax element indicates that the one or more parameters are excluded from the coded representation, and skipped during parsing of the coded representation.

24. The method of any of above solutions, wherein the conversion uses the method due to the video meeting a condition.

25. The method of solution 24, wherein the condition comprises a type of video content or a profile or a tier or a level used by the coded representation.

26. The method of any of above solutions, wherein the condition includes a block dimension of the video block and/or a neighboring video block or a colour format of the video or a coding tree structure used for the conversion of the video block or a type of the video region.

27. The method of any of solutions 1 to 26, wherein the conversion comprises encoding the video into the coded representation.

28. The method of any of solutions 1 to 26, wherein the conversion comprises decoding the coded representation to generate pixel values of the video.

29. A video decoding apparatus comprising a processor configured to implement a method recited in one or more of solutions 1 to 28.

30. A video encoding apparatus comprising a processor configured to implement a method recited in one or more of solutions 1 to 28.

31. A computer program product having computer code stored thereon, the code, when executed by a processor, causes the processor to implement a method recited in any of solutions 1 to 28.

32. A method, apparatus or system described in the present document.

Figure 13:
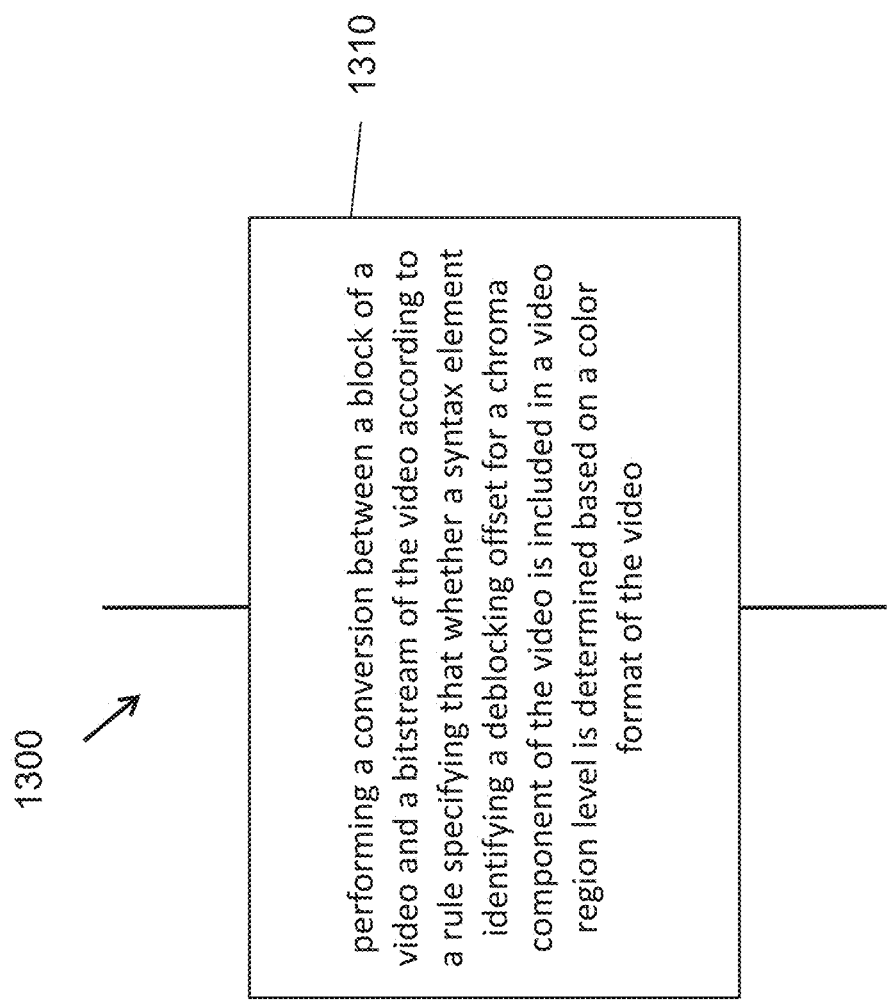
FIG. 13 is a flowchart representation for a method of video processing according to various embodiments of the disclosure.

FIG. 13 is a flowchart representation for a method 1300 of video processing in accordance with the present technology. The method 1300 includes, at operation 1310, performing a conversion between a block of a video and a bitstream of the video according to a rule specifying that whether a syntax element identifying a deblocking offset for a chroma component of the video is included in a video region level is determined based on a colour format of the video. In some embodiments, the syntax element is omitted in case the colour format of the video is 4:0:0. In some embodiments, the colour format is determined based on a parameter ChromaArrayType.

Figure 14:
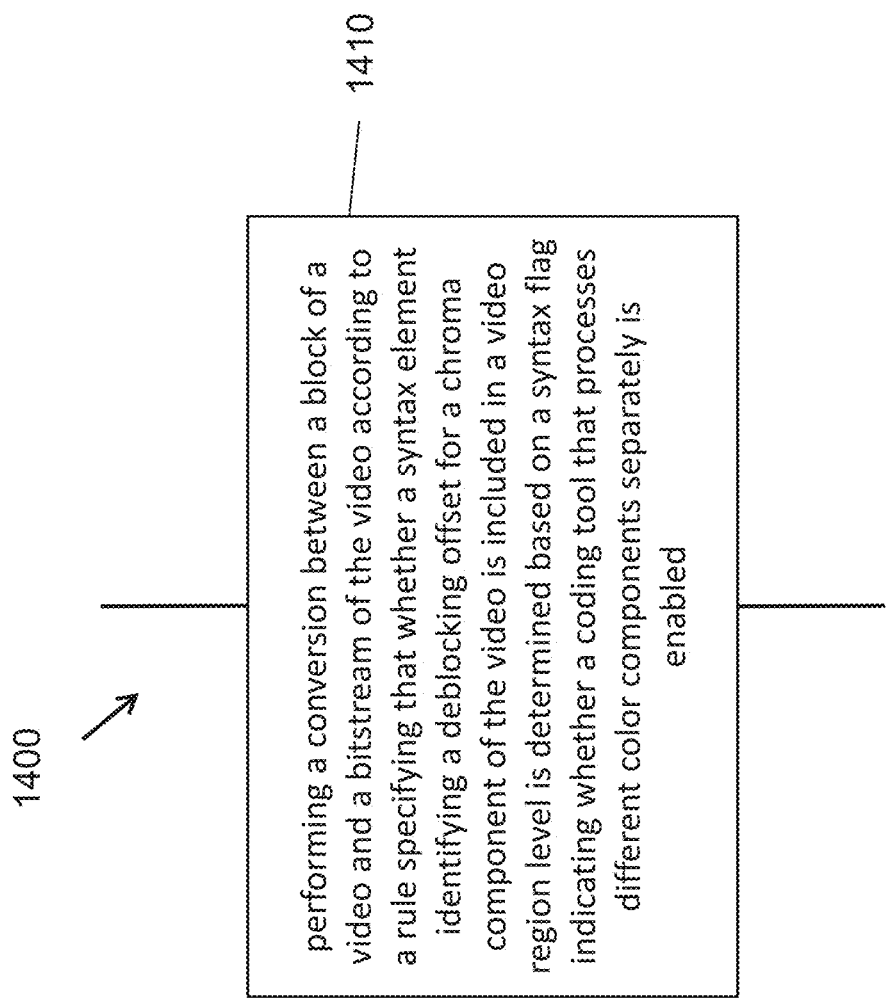
FIG. 14 is a flowchart representation for another method of video processing according to various embodiments of the disclosure.

FIG. 14 is a flowchart representation for a method 1400 of video processing in accordance with the present technology. The method 1400 includes, at operation 1410, performing a conversion between a block of a video and a bitstream of the video according to a rule specifying that whether a syntax element identifying a deblocking offset for a chroma component of the video is included in a video region level is determined based on a syntax flag indicating whether a coding tool that processes different colour components separately is enabled. In some embodiments, the syntax element is omitted in case luma and chroma samples of the block are not separated.

Figure 15:
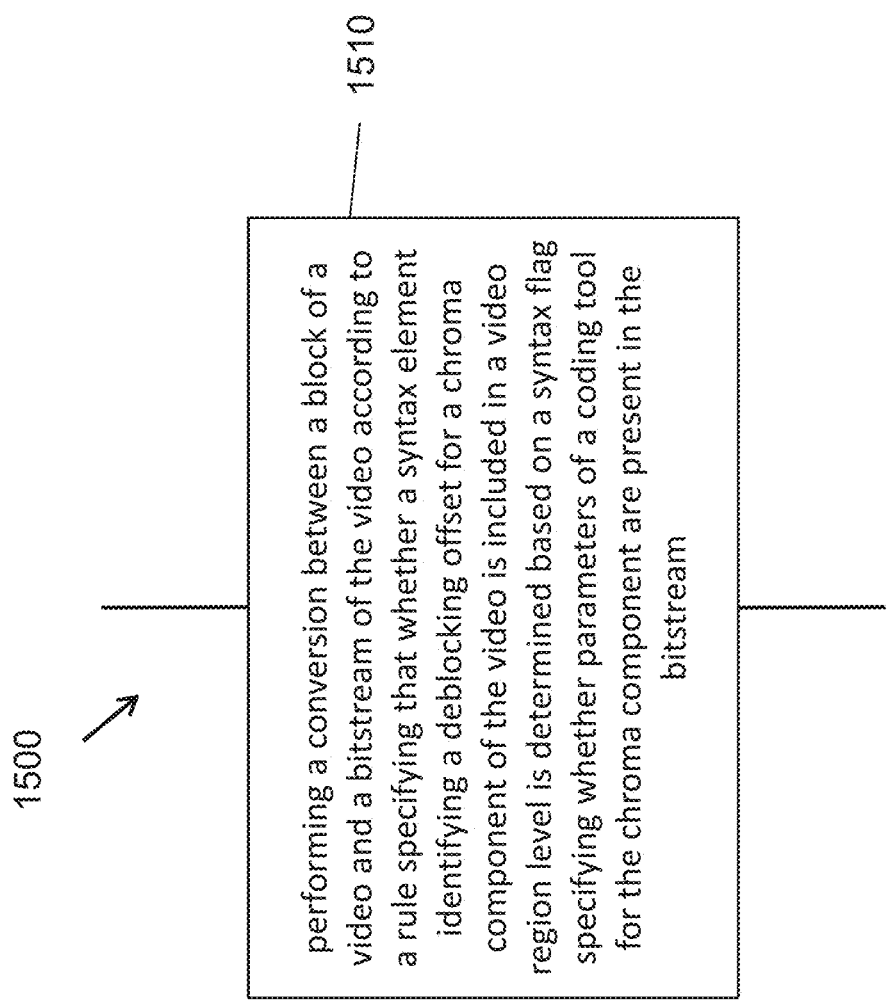
FIG. 15 is a flowchart representation for another method of video processing according to various embodiments of the disclosure.

FIG. 15 is a flowchart representation for a method 1500 of video processing in accordance with the present technology. The method 1500 includes, at operation 1510, performing a conversion between a block of a video and a bitstream of the video according to a rule specifying that whether a syntax element identifying a deblocking offset for a chroma component of the video is included in a video region level is determined based on a syntax flag specifying whether parameters of a coding tool for the chroma component are present in the bitstream. In some embodiments, the syntax element is omitted in case the syntax flag specifies that deblocking offsets of the coding tool for a chroma component are omitted from the bitstream.

In some embodiments, the deblock offset is inferred to be 0 in case the syntax element is omitted from signalling. In some embodiments, the deblocking offset applicable at the video region level comprises at least one of: a first deblocking parameter offset for β (divided by 2) that is applied to a Cb component, wherein the first deblock parameter is denoted as cb_beta_offset_div2, a second deblocking parameter offset for tC (divided by 2) that is applied to the Cb component, wherein the second deblocking parameter is denoted by cb_tc_offset_div2, a third deblocking parameter offset for β (divided by 2) that is applied to a Cr component, wherein the third deblocking parameter is denoted by cr_beta_offset_div2, or a fourth deblocking parameter offset for tC (divided by 2) that is applied to the Cr component, wherein the fourth deblocking parameter is denoted by cr_tc_offset_div2.

In some embodiments, the video region level comprises a picture parameter set. In some embodiments, video region level comprises a picture header. In some embodiments, the video region comprises a slice. In some embodiments, the syntax flag specifying whether parameters of the coding tool for the chroma component are present in the bitstream also determines whether a chroma quantization parameter offset is present in the bitstream.

Figure 16:
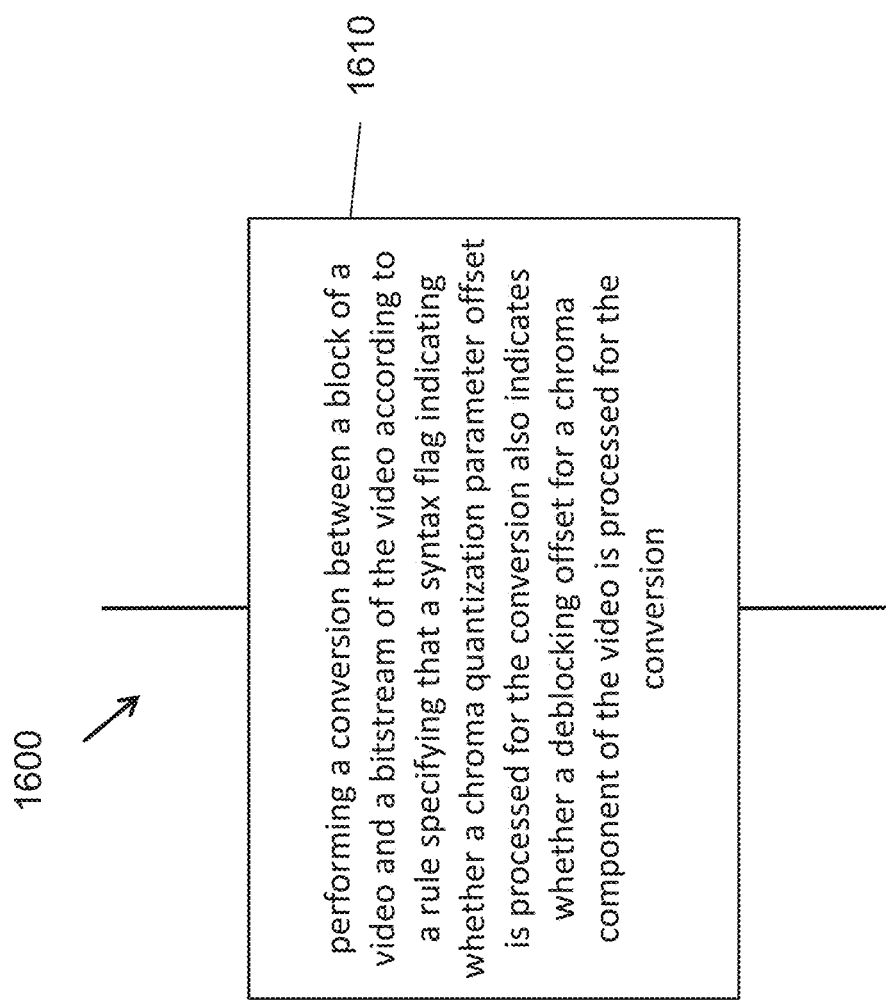
FIG. 16 is a flowchart representation for yet another method of video processing according to various embodiments of the disclosure.

FIG. 16 is a flowchart representation for a method 1600 of video processing in accordance with the present technology. The method 1600 includes, at operation 1610, performing a conversion between a block of a video and a bitstream of the video according to a rule specifying that a syntax flag indicating whether a chroma quantization parameter offset is processed for the conversion also indicates whether a deblocking offset for a chroma component of the video is processed for the conversion.

In some embodiments, the syntax flag includes pps_chroma_tool_params_present_flag. In some embodiments, the syntax flag includes pps_chroma_tool_offsets_present_flag.

In some embodiments, the conversion comprises encoding the video into the bitstream. In some embodiments, the conversion comprises decoding the video from the bitstream.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically EPROM (EEPROM), and flash memory devices; magnetic disks, e.g., internal hard disks or removable disks; magneto optical disks; and compact disc read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
   performing a conversion between a video and a bitstream of the video according to a rule,
   wherein the rule specifies that a first flag relating to coding tool offsets for chroma components is included in a picture parameter set (PPS) in the bitstream,
   wherein the rule further specifies that whether a first set of syntax elements specifying first chroma deblocking parameter offsets are included in the PPS in the bitstream is determined based on a value of the first flag,
   wherein the rule further specifies that whether a second set of syntax elements specifying second chroma deblocking parameter offsets for a video picture of the video are included in a picture header referring to the PPS is determined based on the value of the first flag,
   wherein the rule further specifies that whether a third set of syntax elements specifying third chroma deblocking parameter offsets for a slice of the video picture are included in a slice header referring to the PPS is determined based on the value of the first flag, and
   wherein the value of the first flag relates to a colour format of the video picture.

2. The method of claim 1, wherein the rule further specifies that whether to signal or parse the third chroma deblocking parameter offsets at a slice level or at a higher level is determined based on the value of the first flag.

3. The method of claim 2, wherein the rule further specifies that whether to signal or parse the third chroma deblocking parameter offsets at the slice level or at a picture level is determined based on the value of the first flag.

4. The method of claim 3, wherein the rule further specifies that when the first flag has a first value and the third set of syntax elements are not present, the third chroma deblocking parameter offsets are signalled or parsed at the picture level.

5. The method of claim 1, wherein the rule further specifies that when the first flag has a second value, the first set of syntax elements, the second set of syntax elements, and the third set of syntax elements are not present.

6. The method of claim 5, wherein when the first flag has the second value, signalling or parsing the second chroma deblocking parameter offsets for the video picture and the third chroma deblocking parameter offsets for the slice at a higher level is disallowed.

7. The method of claim 6, wherein when the first flag has the second value, signalling or parsing the second chroma deblocking parameter offsets for the video picture at a PPS level is disallowed, and signaling or parsing the third chroma deblocking parameter offsets for the slice at a picture level is disallowed.

8. The method of claim 7, wherein when the first flag has the second value, the second chroma deblocking parameter offsets for the video picture are signalled or parsed at the picture level, and the third chroma deblocking parameter offsets for the slice are signalled or parsed at a slice level.

9. The method of claim 8, wherein the rule further specifies that whether the first set of syntax elements, the second set of syntax elements, and the third set of syntax elements are included in the bitstream is further based on a value of a second flag related to an application of a deblocking filter,
   wherein the rule further specifies that first syntax elements specifying first luma deblocking parameter offsets are conditionally included in the PPS based on the value of the second flag,
   wherein the rule further specifies that second syntax elements specifying second luma deblocking parameter offsets for the video picture are conditionally included in the picture header referring to the PPS based on the value of the second flag,
   wherein the rule further specifies that third syntax elements specifying third luma deblocking parameter offsets for the slice are conditionally included in the slice header referring to the PPS based on the value of the second flag.

10. The method of claim 9, wherein when the first flag has the second value, the second chroma deblocking parameter offsets for the video picture are signalled or parsed based on the second syntax elements specifying the second luma deblocking parameter offsets for the video picture, and wherein the third chroma deblocking parameter offsets for the slice are signalled or parsed based on the third syntax elements specifying the third luma deblocking parameter offsets for the slice.

11. The method of claim 1, wherein the first set of syntax elements comprises at least one of pps_cb_beta_offset_div2, pps_cb_tc_offset_div2, pps_cr_beta_offset_div2, or pps_cr_tc_offset_div2,
    wherein the second set of syntax elements comprises at least one of ph_cb_beta_offset_div2, ph_cb_tc_offset_div2, ph_cr_beta_offset_div2, or ph_cr_tc_offset_div2, and
    wherein the third set of syntax elements comprises at least one of sh_cb_beta_offset_div2, sh_cb_tc_offset_div2, sh_cr_beta_offset_div2, or sh_cr_tc_offset_div2.

12. The method of claim 1, wherein the first set of syntax elements, the second set of syntax elements, and the third set of syntax elements are omitted from the bitstream when the colour format of the video picture is 4:0:0.

13. The method of claim 1, wherein the rule further specifies that whether a fourth set of syntax elements specifying offsets related to chroma quantization parameters are included in the PPS of the bitstream is determined based on the value of the first flag.

14. The method of claim 13, wherein the rule further specifies that when the fourth set of syntax elements are not present, values of the fourth set of syntax elements are inferred to be equal to 0.

15. The method of claim 13, wherein the fourth set of syntax elements are not present in the bitstream when the colour format of the video picture is 4:0:0.

16. The method of claim 1, wherein the conversion includes encoding the video into the bitstream.

17. The method of claim 1, wherein the conversion includes decoding the video from the bitstream.

18. An apparatus for processing video data comprising a processor and a non-transitory memory with instructions thereon, wherein the instructions upon execution by the processor, cause the processor to:
    perform a conversion between a video and a bitstream of the video according to a rule,
    wherein the rule specifies that a first flag relating to coding tool offsets for chroma components is included in a picture parameter set (PPS) in the bitstream,
    wherein the rule further specifies that whether a first set of syntax elements specifying first chroma deblocking parameter offsets are included in the PPS in the bitstream is determined based on a value of the first flag,
    wherein the rule further specifies that whether a second set of syntax elements specifying second chroma deblocking parameter offsets for a video picture of the video are included in a picture header referring to the PPS is determined based on the value of the first flag,
    wherein the rule further specifies that whether a third set of syntax elements specifying third chroma deblocking parameter offsets for a slice of the video picture are included in a slice header referring to the PPS is determined based on the value of the first flag, and
    wherein the value of the first flag relates to a colour format of the video picture.

19. A non-transitory computer-readable storage medium storing instructions that cause a processor to:
    perform a conversion between a video and a bitstream of the video according to a rule,
    wherein the rule specifies that a first flag relating to coding tool offsets for chroma components is included in a picture parameter set (PPS) in the bitstream,
    wherein the rule further specifies that whether a first set of syntax elements specifying first chroma deblocking parameter offsets are included in the PPS in the bitstream is determined based on a value of the first flag,
    wherein the rule further specifies that whether a second set of syntax elements specifying second chroma deblocking parameter offsets for a video picture of the video are included in a picture header referring to the PPS is determined based on the value of the first flag,
    wherein the rule further specifies that whether a third set of syntax elements specifying third chroma deblocking parameter offsets for a slice of the video picture are included in a slice header referring to the PPS is determined based on the value of the first flag, and
    wherein the value of the first flag relates to a colour format of the video picture.

20. A non-transitory computer-readable recording medium storing a bitstream of a video which is generated by a method performed by a video processing apparatus, wherein the method comprises:
    generating a bitstream of a video according to a rule,
        wherein the rule specifies that a first flag relating to coding tool offsets for chroma components is included in a picture parameter set (PPS) in the bitstream,
        wherein the rule further specifies that whether a first set of syntax elements specifying first chroma deblocking parameter offsets are included in the PPS in the bitstream is determined based on a value of the first flag,
        wherein the rule further specifies that whether a second set of syntax elements specifying second chroma deblocking parameter offsets for a video picture of the video are included in a picture header referring to the PPS is determined based on the value of the first flag,
        wherein the rule further specifies that whether a third set of syntax elements specifying third chroma deblocking parameter offsets for a slice of the video picture are included in a slice header referring to the PPS is determined based on the value of the first flag, and
    wherein the value of the first flag relates to a colour format of the video picture.

\* \* \* \* \*